(12) United States Patent
Yamada et al.

(10) Patent No.: US 7,915,349 B2
(45) Date of Patent: Mar. 29, 2011

(54) CONJUGATED DIENE POLYMER AND PROCESS FOR PRODUCTION THEREOF

(75) Inventors: Haruo Yamada, Tokyo (JP); Keiichi Toda, Tokyo (JP); Norifusa Ishimura, Tokyo (JP)

(73) Assignees: Asahi Kasei Chemicals Corporation, Tokyo (JP); Shin-Etsu Chemical Co., Ltd., Tokyo (JP)

( * ) Notice: Subject to any disclaimer, the term of this patent is extended or adjusted under 35 U.S.C. 154(b) by 341 days.

(21) Appl. No.: 11/992,306

(22) PCT Filed: Sep. 19, 2006

(86) PCT No.: PCT/JP2006/318514
§ 371 (c)(1),
(2), (4) Date: Jun. 27, 2008

(87) PCT Pub. No.: WO2007/034785
PCT Pub. Date: Mar. 29, 2007

(65) Prior Publication Data
US 2009/0163668 A1    Jun. 25, 2009

(30) Foreign Application Priority Data
Sep. 22, 2005 (JP) .................... 2005-275572

(51) Int. Cl.
C08C 19/22 (2006.01)
C08C 19/25 (2006.01)

(52) U.S. Cl. ........ 525/342; 525/374; 525/375; 525/379; 525/382

(58) Field of Classification Search .......... None
See application file for complete search history.

(56) References Cited

U.S. PATENT DOCUMENTS

| | | | |
|---|---|---|---|
| 5,527,753 A | 6/1996 | Engel et al. | |
| 5,708,092 A | 1/1998 | Schwindeman et al. | |
| 2003/0100683 A1* | 5/2003 | Toyoizumi et al. | 525/331.9 |
| 2004/0254301 A1 | 12/2004 | Tsukimawashi et al. | |
| 2005/0203251 A1 | 9/2005 | Oshima et al. | |

FOREIGN PATENT DOCUMENTS

| | | |
|---|---|---|
| GB | 2 241 239 A | 8/1991 |
| JP | 42-8404 | 4/1967 |
| JP | 43-6636 | 3/1968 |
| JP | 58-136604 A | 8/1983 |
| JP | 59-140211 A | 8/1984 |
| JP | 2-9401 B2 | 9/1984 |
| JP | 61-296001 A | 12/1986 |
| JP | 63-4841 B2 | 2/1988 |
| JP | 1-37970 B2 | 8/1989 |
| JP | 1-53851 B2 | 11/1989 |
| JP | 7-233217 A | 9/1995 |
| JP | 7-292161 A | 11/1995 |
| JP | 8-109219 A | 4/1996 |
| JP | 11-29659 A | 2/1999 |
| JP | 11-189616 A | 7/1999 |
| JP | 11-349632 A | 12/1999 |
| JP | 2001-131230 A * | 5/2001 |
| JP | 2004-18795 A | 1/2004 |
| JP | 2004-182894 A | 7/2004 |
| JP | 2005-290355 A | 10/2005 |
| JP | 2006-137858 A | 6/2006 |
| WO | WO 01/23467 A1 | 4/2001 |
| WO | WO 03/074574 * | 9/2003 |
| WO | WO 03/087171 A1 | 10/2003 |

OTHER PUBLICATIONS

Abstract for JP 2001-131230 A.*

* cited by examiner

*Primary Examiner* — Marc S Zimmer
(74) *Attorney, Agent, or Firm* — Birch, Stewart, Kolasch & Birch, LLP

(57) ABSTRACT

A process for producing a conjugated diene polymer composition, which comprises of polymerizing a conjugated diene compound or a conjugated diene compound and an aromatic vinyl compound in a hydrocarbon solvent in the presence of at least one compound selected from the group consisting of organoalkali metals and organoalkaline earth metals as an initiator and then reacting the active end of the resulting polymer with a low molecular compound represented by the following formula (1) or the following formula (2):

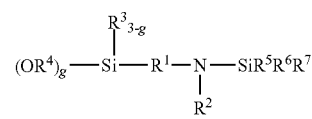

(1)

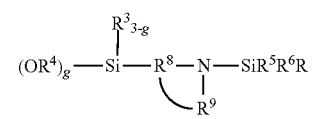

(2)

wherein the variables R through $R^9$ are as defined in the Specification.

9 Claims, No Drawings

CONJUGATED DIENE POLYMER AND PROCESS FOR PRODUCTION THEREOF

TECHNICAL FIELD

The present invention relates to a conjugated diene polymer and a polymer composition thereof, and process for production of them. More specifically, it pertains to a conjugated diene polymer having, in the molecule thereof, a modifying group and a polymer composition thereof, and process for production thereof.

BACKGROUND ART

To satisfy a recent request for reducing a fuel cost of automobiles, there is accordingly a demand for the development of conjugated diene polymers having, as a rubber material for tires, low rolling resistance, excellent abrasion resistance and failure characteristics and also excellent drivability typified by wet skid resistance.

A decrease in hysteresis loss of a vulcanized rubber is necessary for reducing the rolling resistance of tires. As evaluation indicators of a vulcanized rubber, rebound resilience at from 50 to 80° C., tan δ at from 50 to 80° C., and heat build-up measured by a Goodrich meter are used. Rubber materials having high rebound resilience at from 50 to 80° C., or low tan δ at from 50 to 80° C. or small Goodrich heat build-up are preferred. Natural rubber, polyisoprene rubber and polybutadiene rubber are known as rubber materials having low hysteresis loss, but they have undesirably low wet skid resistance. As a method of reducing hysteresis loss without damaging wet skid resistance, proposed is a method of introducing a modifying group at the polymer end of styrene-butadiene (co)polymers having various structures, which are obtained by polymerization in a hydrocarbon solvent in the presence of an organolithium initiator.

WO01-23467 discloses a silica composition of a modified polymer available by reacting the active end of a rubbery polymer with a polyfunctional compound having, in the molecule thereof, an epoxy group. This silica composition however does not have sufficiently improved hysteresis loss and abrasion resistance, and in addition, improvement effects on a carbon blend are small.

Japanese Patent Laid-Open No. Hei 11-29659 and Japanese Patent Laid-Open No. Sho 61-296001 disclose a modified polymer obtained by reacting the active end of a rubbery polymer with a specific amide compound, and a blend composition of the polymer. These modified polymers, when mixed with silica or carbon, have improved hysteresis loss and abrasion resistance, but improvement is not satisfactory.

Japanese Patent Laid-Open No. Hei 7-233217 and WO2003-087171 disclose a diene rubber having a tertiary amino group and an alkoxysilyl group introduced therein. Addition of such a modified polymer to a composition containing silica or a mixture of silica and carbon black improves its physical properties to some extent. The silica-containing composition is inferior in processability to the carbon-black-containing composition so that its processing cost is higher. Polymers having, introduced therein, a functional group having affinity with silica are likely to have deteriorated processability in blending so that their use is limited.

Japanese Patent Laid-Open No. 2004-18795 describes a modified polymer having a primary amino group and an alkoxysilyl group. In addition, it discloses a polymer having a polymer chain copolymerized with a polyfunctional monomer or a polymer obtained by coupling at least a portion of a copolymer with a two or higher functional coupling agent. These modified polymers however have problems such as deterioration of processability due to strong affinity with a filler resulting from the primary amino group and cumbersome control of a hydrolysis step to produce the primary amine.

Japanese Patent Laid-Open No. Hei 11-349632 discloses a diene rubber having a methyleneamino group and an alkoxysilyl group introduced therein and a blend composition of the diene rubber. These modified polymers have, in a carbon-black-containing or silica-containing composition, improved hysteresis loss and abrasion resistance, but their balance between hysteresis loss and wet skid resistance is not improved sufficiently.

Japanese Patent Laid-Open No. 2005-290355 discloses a modified polymer having a tertiary amino group and alkoxysilyl group and a blend composition thereof. Use of such a modified polymer for a silica-containing composition improves hysteresis loss, but its improvement is insufficient.

Japanese Patent Laid-Open No. Hei 11-189616 discloses a modified polymer available by reacting the active end of a rubbery polymer with a cyclic aminoalkoxysilane compound, and a blend composition of the modified polymer. These modified polymers are effective, in a carbon-black-containing or silica-containing blend composition, for improving hysteresis loss and abrasion resistance without impairing wet skid resistance, but the blend composition is likely to have inferior processability.

Japanese Patent Laid-Open No. 2004-182894 discloses a modified polymer having a secondary amino group and an alkoxysilyl group obtained by treating an alkoxysilane compound having an amino group containing an active hydrogen with an organometal compound, reacting the resulting compound with the active end at the polymer, and then removing the metal. The treatment with the organometal compound is however not performed uniformly so that a modification amount is not sufficient. Use of the modified polymer for a silica-containing composition improves hysteresis loss, but the improvement is not sufficient.

Patent Document 1: WO01-23467
Patent Document 2: Japanese Patent Laid-Open No. Hei 11-29659
Patent Document 3: Japanese Patent Laid-Open No. Sho 61-296001
Patent Document 4: Japanese Patent Laid-Open No. Hei 7-233217
Patent Document 5: WO2003-087171
Patent Document 6: Japanese Patent Laid-Open No. 2004-18795
Patent Document 7: Japanese Patent Laid-Open No. Hei 11-349632
Patent Document 8: Japanese Patent Laid-Open No. 2005-290355
Patent Document 9: Japanese Patent Laid-Open No. Hei 11-189616
Patent Document 10: Japanese Patent Laid-Open No. 2004-182894

DISCLOSURE OF THE INVENTION

Problems to be Solved by the Invention

The object of the present invention is to provide a conjugated diene polymer which is, when converted into a vulcanized rubber by vulcanization treatment, excellent in the balance among wet skid resistance, low hysteresis loss property, abrasion resistance and breaking strength, and is therefore useful as a material for tire tread irrespective of the kind or combination of fillers to be added; and a process for production of the conjugated diene polymer. Another object of the present invention is to provide a conjugated diene polymer, when it is used as an elastomer used for applications other than tire tread, having improved strength, flame retardancy, elongation and transparency compared with those of the conventional ones because it enables uniform dispersion of an inorganic filler such as carbon, silica, metal oxide or metal hydroxide; when it is used as an asphalt composition, having improved aggregate holding property; when it is used as a thermoplastic elastomer or thermoplastic resin, having improved compatibility with another polar resin, if blended therewith, and enables uniform and fine dispersion; a polymer composition of the conjugated diene polymer and process for production thereof.

Means for Solving the Problems

The present inventors have carried out an extensive investigation with a view to overcoming the above-described problems. As a result, it has been found that a conjugated diene polymer, which can be obtained by reacting the active end of a polymer with a specific low molecular compound is capable constantly providing a high-performance composition of a high molecular compound and an inorganic or organic material even under mild and wide kneading conditionse, leading to the completion of the present invention.

The present invention provide a diene copolymer obtained by reacting, with a conjugated diene polymer, a low molecular compound having in the molecule thereof a secondary amino group in which a hydrogen atom is substituted with a triorgano-substituted silyl group, an organic group having an N atom not adjacent to the N atom of the secondary amino group, and at least one alkoxysilyl group or a low molecular compound containing a heterocycle having a secondary amino group in which a hydrogen atom is substituted with a triorgano-substituted group and at least one alkoxysilyl group; a hydrolysate of the diene polymer; a polymer composition composed of the diene polymer and hydrolysate thereof; a composition composed of the diene polymer and a conjugated diene polymer coupled with a polyfunctional modifier; and process for production thereof.

Described specifically, the following inventions are provided.

1. A process for producing a conjugated diene polymer composition, which comprises of polymerizing a conjugated diene compound or a conjugated diene compound and an aromatic vinyl compound in a hydrocarbon solvent in the presence of at least one compound selected from the group consisting of organoalkali metals and organoalkaline earth metals as an initiator and then reacting the active end of the resulting polymer with a low molecular compound represented by the following formula (1) or the following formula (2):

[Chemical formula 1]

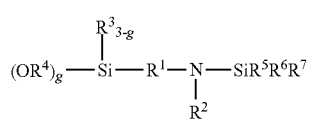

(1)

[Chemical formula 2]

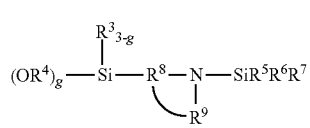

(2)

(wherein in the formula (1), $R^1$ represents an organic group containing an N atom not adjacent to the N atom of the aminosilyl group and having a molecular weight not greater than 1000, $R^2$ represents a $C_{1-10}$ hydrocarbon group or a $C_{1-10}$ hydrocarbon group having no active hydrogen and substituted with an Si, O, N or S atom, $R^3$ and $R^4$ each independently represents a $C_{1-20}$ alkyl group or aryl group, $R^5$, $R^6$, and $R^7$ each represents a $C_{1-20}$ alkyl group or aryl group or a $C_{1-12}$ alkoxy group and g stands for an integer from 1 to 3, and in the formula (2), $R^8$ and $R^9$ each represents a $C_{1-10}$ hydrocarbon group, a $C_{1-10}$ hydrocarbon group having no active hydrogen and substituted with an Si, O, N or S atom, or an organic group containing an N atom not adjacent to the N atom of an aminosilyl group and having a molecular weight of 1000 or less, and $R^3$, $R^4$, $R^5$, $R^6$, $R^7$ and g have the same meanings as described in the formula (1)).

2. A process for producing a conjugated diene polymer composition as described above in 1, wherein polymerizing a conjugated diene compound or a conjugated diene compound and an aromatic vinyl compound in a hydrocarbon solvent in the presence of at least one compound selected from the group consisting of organoalkali metals and organoalkaline earth metals and then the active ends of the conjugated diene polymer is coupled by a polyfunctional modifier before or after reacting the active end of the resulting polymer with a low molecular compound represented by the formula (1) or formula (2).

3. A process for producing a conjugated diene polymer as described above in 1 or 2, wherein the low molecular compound represented by the formula (2) is 3-(4-trialkylsilyl-1-piperazinyl)propylalkyldialkoxysilane, 3-(4-trialkylsilyl-1-piperazinyl)propyltrialkoxysilane, 3-(3-trialkylsilyl-1-imidazolidinyl)propylalkyldialkoxysilane, 3-(3-trialkylsilyl-1-imidazolidinyl)propyltrialkoxysilane, 3-(3-trialkylsilyl-1-hexahydropyrimidinyl)propylalkyldialkoxysilane or 3-(3-trialkylsilyl-1-hexahydropyrimidinyl)propyltrialkoxysilane.

4. A process for producing a conjugated diene polymer as described above in 2, wherein the polyfunctional modifier is a glycidyl compound having, in the molecule thereof, an amino group.

5. A conjugated diene polymer represented by the following formula (3) or the following formula (4):

[Chemical formula 3]

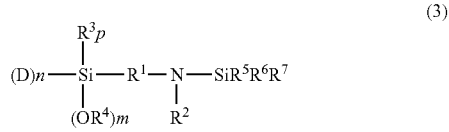

(3)

[Chemical formula 4]

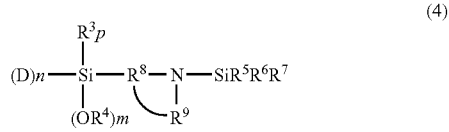

(4)

(wherein, D represents a conjugated diene polymer, in the formula (3), $R^1$ represents an organic group containing an N atom not adjacent to the N atom of the aminosilyl group and having a molecular weight not greater than 1000, $R^2$ represents a $C_{1-10}$ hydrocarbon group or a $C_{1-10}$ hydrocarbon group having no active hydrogen and substituted with an Si, O, N or S atom, $R^3$ and $R^4$ each independently represents a $C_{1-20}$ alkyl group or aryl group, $R^5$, $R^6$, and $R^7$ each represents a $C_{1-20}$ alkyl group or aryl group or a $C_{1-12}$ alkoxy group and n stands for an integer from 1 to 3, m and p each stands for an integer from 0 to 2, and n+m+p=3, and in the formula (4), $R^8$ and $R^9$ each represents a $C_{1-10}$ hydrocarbon group, a $C_{1-10}$ hydrocarbon group having no active hydrogen and substituted with an Si, O, N or S atom or an organic group having an N atom not adjacent to the N atom of the aminosilyl group and having a molecular weight not greater than 1000, and $R^3$, $R^4$, $R^5$, $R^6$, $R^7$, n, m, p, and n+m+p have the same meanings as described in the formula (3)).

6. A conjugated diene polymer represented by the following formula (5) or the following formula (6):

[Chemical formula 5]

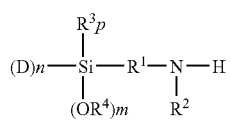

(5)

[Chemical formula 6]

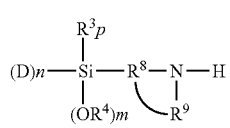

(6)

(wherein, D represents a conjugated diene polymer,
in the formula (5), $R^1$ represents an organic group having an N atom not adjacent to the N atom of the secondary amino group and having a molecular weight not greater than 1000, $R^2$ represents a $C_{1-10}$ hydrocarbon group or a $C_{1-10}$ hydrocarbon group having no active hydrogen and substituted with an Si, O, N or S atom, $R^3$ and $R^4$ each independently represents a $C_{1-20}$ alkyl group or aryl group, and n stands for an integer from 1 to 3, and m and p each stands for an integer from 0 to 2, and n+m+p=3, and in the formula (6), $R^8$ and $R^9$ each represents a $C_{1-10}$ hydrocarbon group, a $C_{1-10}$ hydrocarbon group having no active hydrogen and substituted with an Si, O, N or S atom or an organic group having an N atom not adjacent to the N atom of the secondary amino group and having a molecular weight not greater than 1000, and $R^3$, $R^4$, n, m, p and n+m+p have the same meanings as described in the formula (5)).

7. A conjugated diene polymer composition comprising from 1 to 99 wt. % of a conjugated diene polymer represented by the formula (3) and from 1 to 99 wt. % of a conjugated diene polymer represented by the formula (5), or from 1 to 99 wt. % of a conjugated diene polymer represented by the formula (4) and from 1 to 99 wt. % of a conjugated diene polymer represented by the formula (6).

8. A conjugated diene polymer composition comprising from 5 to 90 wt. % of a conjugated diene polymer coupled with a polyfunctional modifier other than a low molecular compound represented by the formula (1) or the formula (2) and from 10 to 95 wt. % of a conjugated diene polymer(s) represented by the formula (3) and/or the formula (5) or a conjugated diene polymer(s) represented by the formula (4) and/or the formula (6) and having a Mooney viscosity of from 20 to 200.

9. A conjugated diene polymer composition as described above in 8, wherein the polyfunctional modifier is a glycidyl compound having, in the molecule thereof, an amino group.

Effect of the Invention

The diene copolymer of the present invention constantly provides a high-performance composition of a high-molecular compound and an inorganic or organic material even under mild and wide kneading conditions while using various fillers in combination. More specifically, the composition exhibits high performance because the viscosity during kneading of the composition is not too high, a kneading work proceeds without troubles at an adequate torque, and an inorganic filler is dispersed as uniform and fine particles in a conjugated diene polymer matrix of the blend composition thus obtained.

Still more specifically, when the conjugated diene polymer of the present invention is employed, an inorganic filler such as silica or carbon black is uniformly dispersed therein. A vulcanized rubber obtained therefrom for a tire tread application is therefore improved in the balance between low rolling resistance and wet skid resistance, has improved abrasion resistance and moreover, has improved strength, compared with conventional ones. It is therefore a preferred composition also for tire rubber, antivibration rubber and footwear.

When the conjugated diene polymer of the present invention is an elastomer used for applications other than a tire tread, since an inorganic filler such as silica, metal oxide or metal hydroxide is dispersed uniformly therein, use of it is effective for improving strength, flame retardancy, elongation, and transparency compared with that of the conventional ones. Use of it as an asphalt composition is effective for improving an aggregate holding property.

Moreover, when the conjugated diene polymer of the present invention is a thermoplastic elastomer or thermoplastic resin, a blend composition with another polar resin can have improved compatibility and in addition, uniform and fine dispersion can be accomplished.

BEST MODE FOR CARRYING OUT THE INVENTION

Preferred embodiments of the present invention will hereinafter be described specifically.

As described above, the present invention provides a specific conjugated diene polymer having, in the molecule thereof, a modifying group, and a composition of the polymer and process for production thereof. Described specifically, the present invention provides a process for production for producing a diene copolymer comprising of polymerizing a conjugated diene compound or a conjugated diene compound and an aromatic vinyl compound in a hydrocarbon solvent in the presence of an alkali metal initiator or alkaline earth metal initiator and then reacting the active end of the resulting polymer with a specific low molecular compound having, in the molecule thereof, a secondary amino group in which a hydrogen atom is substituted with a triorgano-substituted silyl group, an organic group having an N atom not adjacent to the N atom of the secondary amino group, and at least one alkoxysilyl group or a specific low molecular compound containing a heterocycle having a secondary amino group in which a hydrogen atom is substituted with a triorgano-substituted silyl group and at least one alkoxysilyl group; a diene copolymer preferably available by the process, a hydrolysate of the diene polymer; a polymer composition composed of the diene polymer and a hydrolysate thereof, and a composition composed of the diene polymer and a conjugated diene polymer coupled with a polyfunctional modifying agent. The present invention having such constitutions can therefore exhibit the above-described advantages.

As the alkali metal initiator or alkaline earth metal initiator to be used in the process for production of the present invention, any alkali metal initiator and alkaline earth metal initiator having an ability of initiating polymerization is usable. Of these, at least one compound selected from organoalkali metal compounds and organoalkaline earth metal compounds is preferably employed.

As the organoalkali metal compound, organolithium compounds are especially preferred. The organolithium compounds include those having a low molecular weight, organolithium compounds of a solubilized oligomer, those having, in one molecule thereof, single lithium, those having, in one molecule thereof, a plurality of lithiums, and those in which an organic group and lithium are bound via a carbon-lithium bond, nitrogen-lithium bond or tin-lithium bond.

Specific examples of the organomonolithium compound include n-butyllithium, sec-butyllithium, tert-butyllithium, n-hexyllithium, benzyllithium, phenyllithium, and stilbenelithium; those of the polyfunctional organolithium compound include 1,4-dilithiobutane, reaction products between sec-butyllithium and diisopropenylbenzene, 1,3,5-trilithiobenzene, reaction products among n-butyllithium, 1,3-butadiene and divinylbenzene, and reaction products between n-butyllithium and polyacetylene compound; those of compounds having a nitrogen-lithium bond include dimethylaminolithium, dihexylaminolithium, diisopropylaminolithium and hexamethyleneiminolithium. In addition, organoalkali metal compounds disclosed in U.S. Pat. No. 5,708,092, British Patent No. 2,241,239, U.S. Pat. No. 5,527,753 are usable. Especially preferred are n-butyllithium and sec-butyllithium. These organolithium compounds may be used either singly or in combination.

Examples of another organoalkali metal compound include organosodium compounds, organopotassium compounds, organorubidium compounds and organocesium compounds. Specific examples include sodium naphthalene and potassium naphthalene. In addition, alkoxides, sulfonates, carbonates and amides of lithium, sodium or potassium are usable. These organoalkali metal compounds may be used in combination with another organometal compound.

Typical examples of the alkaline earth metal compound include organomagnesium compounds, organocalcium compounds and organostrontium compounds, more specifically, dibutyl magnesium, ethylbutyl magnesium, and propylbutyl magnesium. In addition, compounds such as alkoxides, sulfonates, carbonates and amides of an alkaline earth metal are used. These organoalkaline earth metal compounds may be used in combination with an organoalkali metal initiator or another organometal compound.

In the present invention, the conjugated diene polymer is preferably available by polymerization in the presence of the above-described alkali metal initiator and/or alkaline earth metal initiator and then growth-inducing anionic polymerization reaction. The production of it is preferably performed by a polymerization system such as batch system or continuous system using one reactor or two or more reactors connected to each other.

In the process for production of the conjugated diene polymer in the present invention, it is especially preferred that the polymer has an active end available by the growth reaction by living anionic polymerization.

The conjugated diene polymer of the present invention is a polymer or copolymer of a conjugated diene compound, or a copolymer of a conjugated diene compound and an aromatic vinyl compound. In the polymerization reaction of the conjugated diene polymer according to the present invention, a small amount of a polar compound may be added for the purpose of randomly copolymerizing an aromatic vinyl compound with a conjugated diene compound, using it as a vinylation agent for controlling the microstructure of the conjugated diene moiety, or improving the rate of polymerization.

Examples of the polar compound include ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene, and 2,2-bis(2-oxolanyl)propane; tertiary amine compounds such as tetramethylethylenediamine, dipiperidinoethane, trimethylamine, triethylamine, pyridine and quinuclidine; alkali metal alkoxide compounds such as potassium-t-amylate, potassium-t-butylate, sodium-t-butylate and sodium amylate; and phosphine compounds such as triphenylphosphine. These polar compounds may be used either singly or in combination of two or more thereof.

The amount of the polar compound is selected, depending on the using purpose and degree of effect. It is usually from 0.01 to 100 moles per mole of the initiator. Such a polar compound (vinylation agent) can be added in an adequate amount as a regulating agent of the microstructure of the polymer diene moiety, depending on a desired vinyl bond content. At the same time, many polar compounds have an effective randomizing effect in the copolymerization between a conjugated diene compound and an aromatic vinyl compound so that they can be used as a regulating agent of the distribution of the aromatic vinyl compound or regulating agent of the styrene block content. The randomization method may be that of adding a portion of 1,3-butadiene intermittently during copolymerization as described in Japanese Patent Laid-Open No. Sho 59-140211.

Examples of the conjugated diene compound include 1,3-butadiene, isoprene, 2,3-dimethyl-1,3-butadiene, 1,3-pentadiene, 3-methyl-1,3,-pentadiene, 1,3-heptadiene and 1,3-hexadiene. They may be used either singly or in combination. Preferred compounds are 1,3-butadiene and isoprene. Examples of the aromatic vinyl compound include styrene, p-methylstyrene, α-methylstyrene, vinylethylbenzene, vinylxylene, vinylnaphthalene and diphenylethylene. They may be used either singly or in combination. Preferred compounds include styrene.

Polyfunctional aromatic vinyl compounds such as divinylbenzene can be added for controlling the branch in order to prevent the cold flow of the conjugated diene polymer.

The molecular weight (weight-average molecular weight: measured by GPC and polystyrene standards are used to calibrate the instrument) of the conjugated diene polymer produced by the process for production of the present invention is preferably from 100000 to 2000000 in consideration of the processability and physical properties.

Examples of the hydrocarbon solvent to be used in the process for production of the conjugated diene polymer according to the present invention include saturated hydrocarbons and aromatic hydrocarbons; aliphatic hydrocarbons such as butane, pentane, hexane, pentane and heptane; alicyclic hydrocarbons such as cyclopentane, cyclohexane, methylcyclopentane and methylcyclohexane; aromatic hydrocarbons such as benzene, toluene, and xylene, and hydrocarbons made of mixtures thereof are used. Before a polymerization reaction of each or mixture of the conjugated diene compound, aromatic vinyl compound and hydrocarbon solvent to be used in the present invention, treatment of impurities such as allenes or acetylenes with an organometal compound enables preparation of a polymer having an active end in a high concentration and achievement of a high modification ratio.

In order to exhibit excellent effects of the present invention especially, it is preferred to produce the conjugated diene polymer so that it will contain a polymer having a functional group component in an amount of preferably 5 wt. % or greater, more preferably 20 wt. % or greater, still more preferably 50 wt. % or greater. The polymer having a functional group component can be determined by chromatography capable of separating a functional-group-containing modifying component and non-modifying component. For this chromatography, quantitative determination with a GPC column using, as a filler, a polar substance such as silica to which the functional group component is adsorbed and using an internal standard of a non-adsorption component for comparison is preferably employed.

Examples of the random copolymer as the conjugated diene polymer of the present invention include butadiene-isoprene random copolymer, butadiene-styrene random copolymer, isoprene-styrene random copolymer and butadiene-isoprene-styrene random copolymer. The random copolymers are, for example, completely random copolymers having a composition close to the statistical random composition and taper random copolymers having a composition distribution in the tapered form. Even in the case of a homopolymer having a single monomer composition, it may have various structures, for example, it may be a polymer with a uniform composition due to a monomer bond system such as 1,4-bond or 1,2-bond, it may have a distribution in the composition, or it may be composed of blocks (having block bonds).

Examples of the block bond include a bond of homopolymer blocks, a bond of random polymer blocks and a bond of taper random polymer blocks. There are, for example, diblock copolymer composed of two such blocks, triblock copolymer composed of three such blocks and tetrablock copolymer composed of four such blocks. Examples of the block polymer include, supposing that a block made of an aromatic vinyl compound such as styrene is represented by S, a block made of a conjugated diene compound such as butadiene or isoprene and/or a copolymer of an aromatic vinyl compound and a conjugated diene compound is represented by B, S-B diblock copolymers, S-B-S triblock copolymers, S-B-S-B tetrablock copolymers, and $(S-B)_m$-X block copolymers.

More typical examples of the block polymer include structures represented by the following formulas:

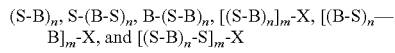

$(S-B)_n$, $S-(B-S)_n$, $B-(S-B)_n$, $[(S-B)_n]_m$-X, $[(B-S)_n$—B$]_m$-X, and $[(S-B)_n$-S$]_m$-X (wherein, the boundary between blocks is not necessarily apparent; when a block B is a copolymer of an aromatic vinyl compound and a conjugated diene compound, the aromatic vinyl compound in the block B may be distributed uniformly or in the tapered form; the block B may have a plurality of portions in which the aromatic vinyl compound is distributed uniformly and/or it is distributed in the tapered form; the block B may have a plurality of segments different in a content of the aromatic vinyl compound; n stands for an integer of 1 or greater, preferably an integer from 1 to 5; m stands for an integer of 2 or greater, preferably an integer from 2 to 11; X represents a residue of a coupling agent or a residue of a polyfunctional initiator; when the copolymer has therein a plurality of the blocks S and a plurality of the blocks B, their structures such as molecular weight and composition may be the same or different; and the structures of the polymer chains bonded to X may be the same or different). In the present invention, the block polymer may be an arbitrary mixture of the compounds having the structure represented by the above-described formula.

In the present invention, some or all of the double bonds of the conjugated diene polymer having a functional group can be converted into saturated hydrocarbons by hydrogenation in an inert solvent. This makes it possible to improve heat resistance and weather resistance and prevent deterioration of products obtained by high-temperature processing. Further, it changes the motility of molecules or improves the compatibility with another high molecular compound. As a result, such a conjugated diene polymer delivers excellent performance in a variety of applications such as automobiles.

More specifically, in the present invention, the hydrogenation ratio of unsaturated double bonds derived from the conjugated diene compound can be selected as desired depending on the using purpose and no particular limitation is imposed on it. In order to obtain a polymer having good heat aging property and weather resistance, it is recommended to adjust the hydrogenation ratio to exceed 70%, preferably 75% or greater, more preferably 85% or greater, especially preferably 90% or greater of the unsaturated double bonds derived from the conjugated diene compound in the polymer. For improving the heat stability, motility of molecules and compatibility with a resin, the hydrogenation ratio of the conjugated diene moiety in the polymer is preferably from 3 to 70%, or from 5 to 65%, especially preferably from 10 to 60%. Although no particular limitation is imposed on the hydrogenation ratio of aromatic double bonds derived from the aromatic vinyl compound in the copolymer of a conjugated diene compound and an aromatic vinyl compound, the hydrogenation ratio is preferably 50% or less, more preferably 30% or less, still more preferably 20% or less. The hydrogenation ratio can be analyzed by a nuclear magnetic resonance (NMR) apparatus.

The hydrogenation can be performed in a known manner. Especially preferred method employed for hydrogenation is to blow gaseous hydrogen into a polymer solution in the presence of a catalyst. As the catalyst, heterogeneous catalysts such as those having a noble metal supported by a porous inorganic substance and homogenous catalyst such as those obtained by solubilizing a salt of nickel, cobalt or the like and then reacting it with an organoaluminum and those using a metallocene such as titanocene. Of these, a titanocene catalyst usable under mild hydrogenation conditions is preferred. Aromatic groups can be hydrogenated using a supported catalyst containing a noble metal.

Specific examples of the hydrogenation catalyst include (1) heterogeneous hydrogenation catalysts obtained by supporting a metal such as Ni, Pt, Pd or Ru on carbon, silica, alumina or diatomaceous earth, (2) so-called Ziegler hydrogenation catalysts using a transition metal such as an organic acid salt of Ni, Co, Fe or Cr or an acetylacetone salt and a reducing agent such as organoaluminum, and (3) so-called organometal complexes such as organometal compounds of Ti, Ru, Rh or Zr. Usable are, for example, hydrogenation catalysts as described in Japanese Patent Publication No. Sho 42-8704, Japanese Patent Publication No. Sho 43-6636, Japanese Patent Publication No. Sho 63-4841, Japanese Patent Publication No. Hei 1-37970, Japanese Patent Publication No. Hei 1-53851, Japanese Patent Publication No. Hei 2-9041, and Japanese Patent Laid-Open No. Hei 8-109219. Preferred hydrogenation catalysts include reaction mixtures of a titanocene compound and a reductive organometal compound.

In the present invention, after polymerization of the conjugated diene compound or the conjugated diene compound and the aromatic vinyl compound, the active end of the resulting polymer is reacted with a specific low molecular compound having, in the molecule thereof, a secondary amino group in which a hydrogen atom is substituted with a triorgano-substituted silyl group, an organic group having an N atom not adjacent to the N atom of the secondary amino group, and at least one alkoxysilyl group, or a specific low molecular compound containing a heterocycle having a secondary amino group in which a hydrogen is substituted with a triorgano-substituted silyl group and at least one alkoxysilyl group. The low molecular compound is preferably an organic compound having a molecular weight of 1000 or less. The above-described low molecular compound is represented by the following formula (1) or the following formula (2):

[Chemical formula 7]

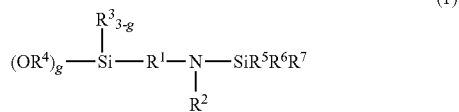

(1)

[Chemical formula 8]

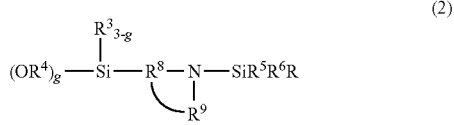

(2)

(wherein in the formula (1), $R^1$ represents an organic group containing an N atom not adjacent to the N atom of the aminosilyl group and having a molecular weight not greater than 1000, $R^2$ represents a $C_{1-10}$ hydrocarbon group or a $C_{1-10}$ hydrocarbon group having no active hydrogen and substituted with an Si, O, N or S atom, $R^3$ and $R^4$ each independently represents a $C_{1-20}$ alkyl group or $C_{6-20}$ aryl group, $R^5$, $R^6$, and $R^7$ each represents a $C_{1-20}$ alkyl group or $C_{6-20}$ aryl group or a $C_{1-12}$ alkoxy group and g stands for an integer from 1 to 3, and in the formula (2), $R^8$ and $R^9$ each represents a $C_{1-10}$ hydrocarbon group, a $C_{1-10}$ hydrocarbon group having no active hydrogen and substituted with an Si, O, N or S atom, or an organic group containing an N atom not adjacent to the N atom of an aminosilyl group and having a molecular weight of 1000 or less, and $R^3$, $R^4$, $R^5$, $R^6$, $R^7$ and g have the same meanings as described in the formula (1)).

In the present invention, $R^1$ is an organic group containing an N atom not adjacent to the N atom of the aminosilyl group and having a molecular weight of 1000 or less, preferably a divalent organic group having a tertiary amino group having no active hydrogen. It may be linear or branched, or may have a heterocycle and it may be saturated or unsaturated. $R^1$ has more preferably a distance corresponding to from 1 to 4 carbon atoms between the silicon atom and the tertiary amino group, a distance corresponding to from 1 to 4 carbon atoms between the tertiary amino group and the secondary amino group in which hydrogen atom is substituted with a tri-substituted silyl group.

$R^2$ is a monovalent $C_{1-10}$ hydrocarbon group or a $C_{1-10}$ hydrocarbon group having no active hydrogen and substituted with an Si, O, N, or S atom and it may have an unsaturated bond. The hydrocarbon group may be either a non-cyclic hydrocarbon group or a cyclic hydrocarbon group. Active hydrogen is hydrogen deactivating the living end such as SiOH, OH, NH or $NH_2$.

Examples of the hydrocarbon group substituted with an Si-containing organic group include trialkylsilylalkyl groups, dialkylarylsilylalkyl groups, triarylsilylalkyl groups, triarylsilylaryl groups and dialkylalkoxysilylalkyl groups; those of the hydrocarbon group substituted with an O-containing organic group include alkoxyalkyl groups, aryloxyalkyl groups and aryloxyaryl groups; and examples of the hydrocarbon group substituted with an N-containing organic group include dialkylaminoalkyl groups, alkylarylaminoalkyl groups, diarylaminoalkyl groups and dialkylaminoaryl groups.

$R^3$ and $R^4$ each independently represents a $C_{1-20}$ alkyl group or aryl group; may contain an unsaturated bond; may be the same or different; and may be either a non-cyclic hydrocarbon group or a cyclic hydrocarbon group.

$R^5$, $R^6$ and $R^7$ each represents a $C_{1-20}$ alkyl group or aryl group or a $C_{1-12}$ alkoxy group; may contain an unsaturated bond; may be the same or different; and may be either a non-cyclic hydrocarbon group or a cyclic hydrocarbon group.

$R^8$ and $R^9$ each represents a $C_{1-10}$ hydrocarbon group, a $C_{1-10}$ hydrocarbon group having no active hydrogen and substituted with an Si, O, N or S atom, or an organic group containing an N atom not adjacent to the N atom of the aminosilyl group and having a molecular weight of 1000 or less. $R^8$ is a trivalent organic group while $R^9$ is a divalent organic group. $R^8$, $R^9$ and N atom form a heterocycle. More preferably, $R^8$ and $R^9$ have at least one tertiary amino group and in this case, still more preferably, the distance between the silicon atom and the tertiary amino group corresponds to from 1 to 4 carbon atoms, the distance between the tertiary amino group and the secondary amino group in which a hydrogen atom is substituted with a trisubstituted silyl group corresponds to from 1 to 4 carbon atoms.

Examples of the low molecular compound represented by the formula (1) include N-[(dialkoxyalkylsilyl)-alkyl]-N,N'-dialkyl-N'-trialkylsilyl-alkylenediamine, N-[(trialkoxysilyl)-alkyl]-N,N'-dialkyl-N'-trialkylsilyl-alkylenediamine, N-[(dialkoxyalkylsilyl)-alkyl]-N,N'-dialkyl-N'-trialkylsilyl-phenylenediamine, N-[(trialkoxysilyl)-alkyl]-N,N'-dilakyl-N'-trialkylsilyl-phenylenediamine, 3-(trialkylsilylalkylamino)-1-pyrrolidinylalkyl-alkyl-dialkoxysilane, 3-(trialkylsilylalkylamino)-1-pyrrolidinyl-alkyl-trialkoxysilane, N-[(dialkoxyalkylsilyl)-alkyl]-N-alkyl-N'-(alkoxyalkyl)-N'-trialkylsilyl-alkylenediamine, N-[(trialkoxysilyl)-alkyl]-N-alkyl-N'-(alkoxyalkyl)-N'-trialkylsilylalkylenediamine, N-[(dialkoxyalkylsilyl)-alkyl]-N-alkyl-N'-(dialkylaminoalkyl)-N'-trialkylsilyl-alkylenediamine, and N-[(trialkoxysilyl)-alkyl]-N-alkyl-N'-(dialkylaminoalkyl)-N'-trialkylsilyl-alkylenediamine. The following are specific examples of them.

Examples include N-[3-(methyltrimethylsilyl)-propyl]-N,N'-diethyl-N'-trimethylsilyl-ethane-1,2-diamine, N-[3-(triethoxysilyl)-propyl]-N,N'-diethyl-N'-trimethylsilyl-ethane-1,2-diamine, N-[3-(methyltrimethylsilyl)-propyl]-N,N'-diethyl-N'-trimethylsilyl-phenylenediamine, N-[3-(triethoxysilyl)-propyl]-N,N'-diethyl-N'-trimethylsilyl-phenylenediamine, 3-[3-(trimethylsilylethylamino)-1-pyrrolidinyl]-propyl-methyldiethoxysilane, 3-[3-(trimethylsilylpropylamino)-1-pyrrolidinyl]-propyl-triethoxysilane, N-[3-(diethoxymethylsilyl)-propyl]-N-ethyl-N'-(2-ethoxyethyl)-N'-trimethylsilyl-ethane-1,2-diamine, N-[3-(tripropoxysilyl)-propyl]-N-propyl-N'-(2-ethoxyethyl)-N'-triethylsilyl-p-phenylendiamine, N-[2-(diethoxymethylsilyl)-1-methylethyl]-N-ethyl-N'-(2-diethylamino-ethyl)-N'-triethylsilyl-ethane-1,2-diamine, and N-[3-(triethoxysilyl)-propyl]-N-ethyl-N'-(2-diethylaminoethyl)-N'-triethylsilyl-ethane-1,2-diamine. A preferred compound is N-[3-(triethoxysilyl)-propyl]-N,N'-diethyl-N'-trimethylsilyl-ethane-1,2-diamine.

Examples of the low molecular compound represented by the formula (2) include (4-trialkylsilyl-1-piperazinyl)-alkyl-alkyldialkoxysilane, (4-trialkylsilyl-1-piperazinyl)-alkyl-trialkoxysilane, (3-trialkylsilyl-1-imidazolidinyl)-alkyl-alkyl-dialkoxysilane, (3-trialkylsilyl-1-imidazolidinyl)-alkyl-trialkoxysilane, (3-trialkylsilyl-1-hexahydropyrimidinyl)- alkyl-propylalkyldialkoxysilane, and (3-trialkylsilyl-1-hexahydropyrimidinyl)-alkyl-trialkoxysilane. The following are specific compounds of them.

Examples include 3-(4-trimethylsilyl-1-piperazinyl)propylmethyldimethoxysilane, 3-(4-trimethylsilyl-1-piperazinyl)propyltriethoxysilane, 3-(4-trimethylsilyl-1-piperazinyl)propyltributoxysilane, 3-(3-trimethylsilyl-1-imidazolidinyl)propylethyldiethoxysilane, 3-(3-trimethylsilyl-1-imidazolidinyl)propyltriethoxysilane, 3-(3-trimethylsilyl-1-hexahydropyrimidinyl)propylmethyldimethoxysilane, 3-(3-trimethylsilyl-1-hexahydropyrimidinyl)propyltriethoxysilane and 4-(4-trimethylsilyl-1-piperazinyl)butyltriethoxysilane. A preferred compound is 3-(4-trimethylsilyl-1-piperazinyl)propyltriethoxysilane.

One of these low molecular compounds or two or more of them used in combination can be reacted with the active end of the polymer obtained by polymerizing the conjugated diene compound or the conjugated diene compound and the aromatic vinyl compound. In the present invention, use of the low molecular compound represented by the formula (2) as a main component is preferred because it provides excellent balance among low hysteresis loss property, wet skid resistance, abrasion resistance and breaking strength.

The present invention relates to a diene copolymer available by reacting a conjugated diene polymer with a low molecular compound having, in the molecule thereof, a secondary amino group in which a hydrogen atom is substituted with a triorgano-substituted silyl group, an organic group having an N atom not adjacent to the N atom of the secondary amino group, and at least one alkoxysilyl group or a low molecular compound containing a heterocycle having a secondary amino group in which a hydrogen atom is substituted with a triorgano-substituted silyl group and at least one alkoxysilyl group; a hydrolysate of the diene polymer; a polymer composition composed of the diene polymer and hydrolysate thereof; and a composition composed of the diene polymer and a conjugated diene polymer coupled with a polyfunctional modifier; and process for production thereof. Reaction of the conjugated diene polymer having an active end with the low molecular compound represented by the above-described formula (1) or the above-described formula (2) yields, immediately after the reaction, a diene polymer represented by the following formula (3) or the following formula (4):

[Chemical formula 9]

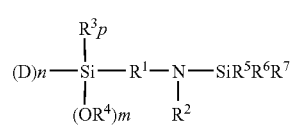

(3)

[Chemical formula 10]

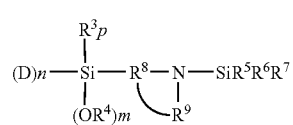

(4)

(wherein, D represents a conjugated diene polymer, in the formula (3), $R^1$ represents an organic group containing an N atom not adjacent to the N atom of the aminosilyl group and having a molecular weight not greater than 1000, $R^2$ represents a $C_{1-10}$ hydrocarbon group or a $C_{1-10}$ hydrocarbon group having no active hydrogen and substituted with an Si, O, N or S atom, $R^3$ and $R^4$ each independently represents a $C_{1-20}$ alkyl group or aryl group, $R^5$, $R^6$, and $R^7$ each represents a $C_{1-20}$ alkyl group or aryl group or a $C_{1-12}$ alkoxy group and n stands for an integer from 1 to 3, m and p each stands for an integer from 0 to 2, and n+m+p=3, and in the formula (4), $R^8$ and $R^9$ each represents a $C_{1-10}$ hydrocarbon group, a $C_{1-10}$ hydrocarbon group having no active hydrogen and substituted with an Si, O, N or S atom or an organic group having an N atom not adjacent to the N atom of the aminosilyl group and having a molecular weight not greater than 1000, and $R^3$, $R^4$, $R^5$, $R^6$, $R^7$, n, m, p, and n+m+p have the same meanings as described in the formula (3)).

During a subsequent step of separating and collecting the diene polymer from the hydrocarbon solvent, more specifically, a steam stripping step, a portion of the secondary amino group (>N—$SiR^5R^6R^7$ group) in which a hydrogen atom is substituted with the triorgano-substituted silyl group of the diene polymer becomes a secondary amino group >N—H) by the hydrolytic action with water or the like, whereby a diene polymer represented by the following formula (5) or the following formula (6) is obtained.

[Chemical formula 11]

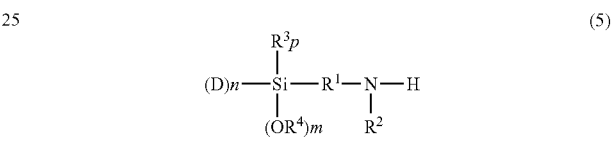

(5)

[Chemical formula 12]

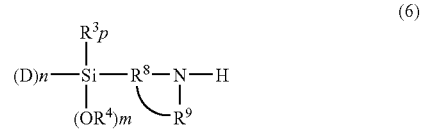

(6)

Its degree is influenced partly by the pH of water in steam stripping. Accordingly, the diene polymer of the present invention collected industrially from the hydrocarbon solvent becomes a diene copolymer by the reaction with a low molecular compound, hydrolysate of the diene polymer, and a polymer composition composed of the diene polymer and the hydrolysate thereof. The composition is preferably a conjugated diene polymer composition composed of from 1 to 99 wt. % of the conjugated diene polymer represented by the formula (3) and from 1 to 99 wt. % of the conjugated diene polymer represented by the formula (5) or from 1 to 99 wt. % of the conjugated diene polymer represented by the formula (4) and from 1 to 99 wt. % of the conjugated diene polymer represented by the formula (6).

In the present invention, it is preferred to, polymerization of the conjugated diene compound or the conjugated diene compound and the aromatic vinyl compound and then react the active end of the polymer or the conjugated diene polymer with a polyfunctional modifier before or after reacting the active end of the polymer with the low molecular compound. By this reaction, the polymer or a portion of the polymer is coupled with a polyfunctional modifier to yield a conjugated diene polymer composition in which the conjugated diene polymer reacted with the low molecular compound and having a modifying group has been coupled with the polyfunctional modifier. Use of the polyfunctional modifier enables improvement of cold flow property and processability. As the polyfunctional modifier, compounds having one or more functional groups selected from epoxy group, carbonyl group, carboxylate group, carboxylic amide group, acid anhydride group, phosphate group, phosphite group, epithio group, thiocarbonyl group, thiocarboxylate group, dithiocarboxylate group, thiocarboxylic amide group, imino group, ethyleneimino group, halogen group, alkoxysilyl group, isocyanate group, thioisocyanate group, conjugated diene group and aryl vinyl group.

In the calculation of the number of moles of the functional group, epoxy group, carbonyl group, epithio group, thiocarbonyl group, imino group, ethyleneimino group, halogen group, conjugated diene group, arylvinyl group, or alkoxy group per alkoxysilyl group must be regarded as monofunctional; carboxylate group, carboxylic amide group, acid anhydride group, thiocarboxylate group, dithiocarboxylate group, thiocarboxylic amide group, isocyanate group, or thioisocyanate group must be regarded as bifunctional; and a phosphate group or phosphite group must be regarded as trifunctional. Polyfunctional modifiers preferably employed in the present invention have, in one molecule thereof, two or more functional groups, more preferably three or more functional groups in total.

Specific examples of the polyfunctional modifier include polyglycidyl ethers of a polyhydric alcohol such as ethylene glycol diglycidyl ether and glycerin triglycidyl ether; polyglycidyl ethers of an aromatic compound having two or more phenyl groups such as diglycidylated bisphenol A; polyepoxy compounds such as 1,4-diglycidylbenzene, 1,3,5-triglycidylbenzene, and polyepoxylated liquid polybutadiene; epoxy-containing tertiary amines such as 4,4'-diglycidyl-diphenylmethylamine and 4,4'-diglycidyl-dibenzylmethylamine; glycidylamino compounds such as diglycidylaniline, diglycidylorthotoluidine, tetraglycidylmethaxylenediamine, tetraglycidylaminodiphenylmethane, tetraglycidyl-p-phenylenediamine, diglycidylaminomethylcyclohexane and tetraglycidyl-1,3-bisaminomethylcyclohexane, and compounds having an epoxy group and another functional group such as 3-glycidoxypropyltrimethoxysilane, 3-glycidoxypropyltriethoxysilane, 3-glycidoxypropyltributoxysilane, epoxy-modified silicone, epoxylated soybean oil and epoxylated linseed oil.

Further examples of it include alkoxysilane compounds such as tetramethoxysilane, tetraethoxysilane, tetrabutoxysilane and alkyltriphenoxysilane, and compounds having an imino group and alkoxysilyl group such as N-(1,3-dimethylbutylidene)-3-(triethoxysilyl)-1-propaneamine, N-(1,3-dimethylbutylidene)-3-(tributoxysilyl)-1-propaneamine, N-(1-methylpropylidene)-3-(triethoxysilyl)-1-propaneamine, N-ethylidene-3-(triethoxysilyl)-1-propaneamine, and N-(3-triethoxysilylpropyl)-4,5-dihydroimidazole.

Still further examples of it include isocyanate compounds such as 2,4-tolylene diisocyanate, 2,6-tolylene diisocyanate, diphenylmethane diisocyanate, diphenylethane diisocyanate, and 1,3,5-benzene triisocyanate.

Still further examples include halogenated silane compounds such as silicon tetrachloride, silicon tetrabromide, silicon tetraiodide, monomethyltrichlorosilicon, monoethyltrichlorosilicon, monobutyltrichlorosilicon, monohexyltrichlorosilicon, monomethyltribromosilicon, and bistrichlorosilylethane; and halogenated alkoxysilane compounds such as monochlorotrimethoxysilane, monobromotrimethoxysilane, dichlorodimethoxysilane, dibromodimethoxysilane, trichloromethoxysilane and tribromomethoxysilane.

Still further examples include tin halide compounds such as tin tetrachloride, tin terabromide, monomethyltrichlorotin, monoethyltrichlorotin, monobutyltrichlorotin, monophenyltrichlorotin and bistrichlorostannylethane; phosphorus polyhalide compounds such as trichlorophosphine and tribromophosphine; phosphite compounds such as trisnonylphenylphosphite, trimethylphosphite and triethylphosphite, and phosphate compounds such as trimethylphosphate and triethylphosphate.

Still further examples include carboxylate compounds such as dimethyl adipate, diethyl adipate, dimethyl terephthalate, diethyl terephthalate, dimethyl phthalate, and dimethyl isophthalate; acid-anhydride-containing compounds such as pyromellitic anhydride and styrene-maleic anhydride copolymer; amide-containing compounds such as adipic bis-dimethylamide and polymethacrylic dimethylamide, carbonyl-containing compounds such as 4,4'-diacetylbenzophenone and 3-acetylpropoxytrimethoxysilane; arylvinyl-containing compounds such as divinylbenzene, diisopropenylbenzene and divinylbenzene oligomer; and halogenated-hydrocarbon-containing compounds such as trichloropropane, tribromopropane, tetrachlorobutane and 3-chloropropoxytrimethoxysilane. They may be used either singly or in combination.

Polyfunctional modifiers having a functional group with a strong affinity with silica are more preferred. Tetrafunctional to hexafunctional polyepoxy compounds or compounds having both an epoxy group and an alkoxysilyl group and having 4 to 6 functional groups in total, which are highly effective for increasing the molecular weight by coupling, are more preferred. Glycidyl compounds having, in the molecule thereof, an amino group are more preferred and compounds having, in the molecule thereof, two or three diglycidylamino groups are especially preferred. Examples include tetraglycidylmetaxylenediamine, tetraglycidylaminodiphenylmethane, tetraglycidyl-p-phenylenediamine, diglycidylaminomethylcyclohexane and tetraglycidyl-1,3-bisaminomethylcyclohexane. These polyfunctional modifiers may be used either singly or in combination of two or more thereof.

When the polyfunctional modifier is used in the present invention, after polymerization of the conjugated diene compound or the conjugated diene compound and the aromatic vinyl compound, the reaction between the active end thereof and the low molecular compound having, in the molecule thereof, a secondary amino group in which a hydrogen atom is substituted with a triorgano-substituted silyl group, an organic group having an N atom not adjacent to the N atom of the secondary amino group and at least one alkoxysilyl group or the low molecular compound containing a heterocycle having a secondary amino group in which a hydrogen atom is substituted with a triorgano-substituted silyl group and at least one alkoxysilyl group and the reaction with the polyfunctional modifier may be performed any order. After coupling reaction with the polyfunctional modifier, the low molecular compound may be reacted with the remaining active end; after reaction with the low molecular compound, the remaining active end may be reacted with the polyfunctional modifier; or they may be conducted simultaneously. It is especially preferred to carry out a coupling reaction with the polyfunctional modifier and then react the remaining active end with the low molecular compound in order to produce a polymer having a functional group component in a high ratio. The low molecular compound and polyfunctional modifier may each be added in an amount of from 0.02 to 5 times the mole of the active end of the polymer or conjugated diene polymer. Amounts less than 0.02 times the mole may fail to produce a composition, which is obtained by vulcanization using the conjugated diene polymer of the invention, having a performance excellent in balance among sufficiently low hysteresis loss, abrasion resistance and breaking strength. Amounts exceeding 5 times the mole lead to problems such as rise in modification cost and removal of unreacted substances. The amount is preferably from 0.05 to 3 times, more preferably from 0.1 to 2 times the mole. In the present invention, it is also possible to produce the conjugated diene polymer composition by polymerizing the conjugated diene compound or the conjugated diene compound and the aromatic vinyl compound, reacting the active end of the resulting polymer with the low molecular compound having, in the molecule thereof, a secondary amino group in which a hydrogen atom is substituted with a triorgano-substituted silyl group, an organic group having an N atom not adjacent to the N atom of the secondary amino group, and at least one alkoxysilyl group or a low molecular compound containing a heterocycle having a secondary amino group in which a hydrogen atom is substituted with a triorgano-substituted silyl group and at least one alkoxysilyl group and the polyfunctional modifier respectively, and blending these two or more modified polymer solutions within an adequate amount range.

The conjugated diene (co)polymer contains the (co)polymer component obtained by reacting the conjugated diene polymer of the present invention with the low molecular compound having, in the molecule thereof, a secondary amino group in which a hydrogen atom is substituted with a triorgano-substituted silyl group, an organic group having an N atom not adjacent to the N atom of the secondary amino group, and at least one alkoxysilyl group or the low molecular compound containing a heterocycle having a secondary amino group in which a hydrogen atom is substituted with a triorgano-substituted silyl group and at least one alkoxysilyl group in an amount of preferably from 5 wt. % to 100 wt. %, more preferably from 20 wt. % to 90 wt. %. In the case of a conjugated diene polymer composition containing a (co) polymer component reacted with a polyfunctional modifier, a ratio of the (co)polymer component reacted with the low molecular compound having a secondary amino group, an organic group having an N atom not adjacent to the N atom of the secondary amino group and at least one alkoxysilyl group to the (co)polymer component reacted with the polyfunctional modifier is within a range of preferably from 95/5 to 5/95, more preferably from 60/40 to 5/95, still more preferably from 70/30 to 95/5. Within the above-described range, the composition features a small cold flow property of the polymer and excellent processability upon mixing and provides a vulcanized rubber excellent in the balance among wet skid resistance, low hysteresis loss property, abrasion resistance and breaking strength which is the object of the present invention.

The conjugated diene copolymer contains the (co)polymer component reacted with the low molecular compound having, in the molecule thereof, a secondary amino group in which a hydrogen atom substituted with a triorgano-substituted silyl group, an organic group having an N atom not adjacent to the N atom of the secondary amino group, and at least one alkoxysilyl group or the low molecular compound containing a heterocycle with a secondary amino group in which a hydrogen atom is substituted with a triorgano-substituted silyl group and at least one alkoxysilyl group and the (co)polymer component reacted with the polyfunctional modifier in a total amount of 50 wt. % or greater, more preferably 70 wt. % or greater. The composition having these components within the above-described range can provide a vulcanized rubber excellent in the balance among wet skid resistance, low hysteresis loss property, abrasion resistance and breaking strength.

In the present invention, a reaction terminator may be added as needed to a solution of the polymer in an inert solvent. As the reaction terminator, an alcohol such as methanol, ethanol or propanol, an organic acid such as stearic acid, lauric acid or octanoic acid, or water is usually employed.

In the present invention, metals contained in the polymer may be deashed as needed. It is the common practice to deash metals by bringing water, an organic acid, an inorganic acid or an oxidizing agent such as hydrogen peroxide into contact with the polymer solution to extract metals and then separate the water layer therefrom.

In the present invention, an antioxidant may be added to the solution of the polymer in an inert solvent. Examples of the antioxidant include phenolic stabilizers, phosphorus stabilizers and sulfur stabilizers.

The polymer can be obtained from the polymer solution in a known manner. Examples of the usable method include a method of separating the solvent by steam stripping or the like, filtering out the polymer and then dehydrating and drying to obtain the polymer; a method of concentrating the solution in a flashing tank and then devolatilizing the concentrate using a vented extruder; and a method of directly devolatilizing the solution by using a drum dryer or the like.

Unusually excellent effects can be achieved by dispersing, in the modifying-group-containing conjugated diene polymer or conjugated diene polymer composition of the present invention, a filler selected from the group consisting of silica inorganic fillers, metal oxides and metal hydroxides. Use of synthetic silicic acid having a primary particle size of 50 nm or less as a silica inorganic filler is especially preferred. In this case, the filler can be dispersed speedily, uniformly and in the fine particle form with good reproducibility by kneading in a short time and the polymer or polymer composition added with the filler has considerably good physical properties.

Production of a conjugated diene random copolymer will next be described more specifically as one preferred embodiment of the present invention.

By using a conjugated diene or a combination of a conjugated diene and styrene as a monomer, a living conjugated diene homopolymer or a living random copolymer of the conjugated diene and styrene is obtained in an inert solvent in the presence of an organic monolithium compound as an initiator. The resulting polymer has a glass transition point of from $-100°$ C. to $0°$ C. and has a 1,4-bond: 1,2-bond or 3,4-bond ratio, in the conjugated diene moiety, of from 10:90% to 90:10%. The bound styrene content in the copolymer is from 0 to 50 wt. % and the styrene chain distribution in the copolymer has more preferably a complete random structure. In short, isolated styrene (one styrene unit) available by decomposition with ozone amounts to 40 wt. % or greater of the total bound styrene and chained styrene (having 8 or more styrene units connected to each other) amounts to 5 wt. % or less, preferably 2.5 wt. % or less of the total bound styrene. To a solution of the living polymer, a low molecular compound having two or more tertiary amino groups and one or more alkoxysilyl group is added, followed by uniform mixing by stirring. Alternatively, a predetermined amount of a polyfunctional modifier having three or more, in total, of functional groups is added to cause a reaction instantly by stirring, then to the remaining living polymer is added a low molecular compound having two or more tertiary amino groups and one or more alkoxysilyl group, followed by uniform mixing by stirring. The polymer thus obtained has, at the end thereof, a hydroxyl group, amino group, epoxy group or alkoxysilyl group at an arbitrary ratio.

Another preferred embodiment is production of a conjugated diene block copolymer.

The molecular weight of the polymer is typically controlled, depending on its application or using purpose. The raw material rubber for vulcanizing rubber is usually adjusted to have a Mooney viscosity (100° C. 1+4 minutes) of from 20 to 100. When the Mooney viscosity is high, an extender oil is usually added to adjust it within the above-described range for facilitating a finishing step during production or improving processability upon kneading, dispersion of a filler and various properties due to improved dispersion. As the extender oil, an aromatic oil, naphthenic oil, paraffinic oil and an alternative aromatic oil having a 3 wt. % or less of PCA as determined by the method of IP346 are preferred. Examples of the alternative aromatic oil include TDAE and MES, described in *Kautschuk Gummi Kunststoffe* 52(12), 799 (1999), and SRAE, product of Japan Energy. An amount of the extender oil is not limited, but is usually from 10 to 50 parts by weight, typically from 20 to 37.5 parts by weight based on 100 parts by weight of the polymer.

When the polymer available by the process for production of the present invention is used for vulcanized rubber applications, for example, automobile parts such as tires and anti-vibration rubber and footwear, a silica inorganic filler is preferably employed as a reinforcing agent. Synthetic silicic acid having a primary particle size of 50 nm or less is especially preferred. As synthetic silicic acid, wet silica and dry silica are preferred.

As the reinforcing agent, a carbon black is also usable. Although the carbon black is not particular limited, examples include furnace black, acetylene black, thermal black, channel black and graphite. Of these, furnace black is especially preferred.

The polymer or composition of the polymer according to the present invention is preferably employed as a vulcanized rubber composition obtained by adding, to 100 parts by weight of the polymer, either one or both of from 1 to 100 parts by weight of silica particles and from 1 to 100 parts by weight of carbon black. In such a composition, the advantage of the present invention appears as good and stable dispersion of silica and excellent performance of a vulcanized rubber. More specifically, an inorganic filler and carbon black are dispersed uniformly in the composition so that a vulcanized rubber obtained using it has less strain dependence of storage elastic modulus. In tire tread applications, the improvement in the balance of low rolling resistance and wet skid resistance and improvement in abrasion resistance and moreover, improvement in strength can be accomplished by the use of the composition so that it is suited also for tire rubber, anti-vibration rubber or footwear.

The polymer or composition of the polymer of the present invention is used either singly or mixed with another rubber. When it is mixed with another rubber, a too small proportion of the polymer of the present invention is not preferred because it does not deliver the modification effect sufficiently. Examples of the another rubber include natural rubber, polyisoprene rubber, emulsion polymerized styrene-butadiene copolymer rubber, solution polymerized random SBR (bound styrene: from 5 to 50 wt. %, 1,2-vinyl bond content of the butadiene bond unit: from 10 to 80%), high-trans SBR (1,4-trans bond content of the butadiene bond unit: from 70 to 95%), low-cis polybutadiene rubber, high-cis polybutadiene rubber, high-trans polybutadiene rubber (1,4-trans bond content of the butadiene bond unit: from 70 to 95%), styrene-isoprene copolymer rubber, butadiene-isoprene copolymer rubber, solution polymerized random styrene-butadiene-isoprene copolymer rubber, emulsion polymerized random styrene-butadiene-isoprene copolymer rubber, emulsion polymerized styrene-acrylonitrile-butadiene copolymer rubber, acrylonitrile-butadiene copolymer rubber, and high-vinyl-SBR-low-vinyl SBR block copolymer rubber and block copolymers such as polystyrene-polybutadiene-polystyrene block copolymer. A proper one is selected depending on the required characteristics.

When as rubber components, the polymer of the invention and the another rubber are used in combination, their ratio is, in terms of weight ratio, usually from 10 to 95:90 to 5, preferably from 20 to 90:80 to 10, more preferably from 30 to 80:70 to 20. In addition, reinforcing agent, vulcanizing agent, vulcanizing accelerator, vulcanizing aid, oil and the like can be added as an additive to rubber.

The vulcanizing agent is not particularly limited, but examples include sulfur such as powder sulfur, precipitated sulfur, colloidal sulfur, insoluble sulfur and highly dispersible sulfur; sulfur halide such as sulfur monochloride and sulfur dichloride, and organic peroxides such as dicumyl peroxide and ditertiary butyl peroxide. Of these, sulfur is preferred, with powder sulfur being especially preferred.

The vulcanizing agent is added in an amount of usually from 0.1 to 15 parts by weight, preferably from 0.3 to 10 parts by weight, more preferably from 0.5 to 5 parts by weight based on 100 parts by weight of the rubber components.

Examples of the vulcanizing accelerator include sulfenamide, thiourea, thiazole, dithiocarbamic acid and xanthogenic acid vulcanizing accelerators. The vulcanizing accelerator is added in an amount of usually from 0.1 to 15 parts by weight, preferably from 0.3 to 10 parts by weight, more preferably from 0.5 to 5 parts by weight, based on 100 parts by weight of the rubber components.

The vulcanizing aid is not particularly limited, but stearic acid and zinc oxide are usable.

As the oil, aromatic, naphthenic, paraffinic and silicone extender oils are selected depending on the using purpose. The extender oil is added in an amount of usually from 1 to 150 parts by weight, preferably from 2 to 100 parts by weight, more preferably from 3 to 60 parts by weight based on 100 parts by weight of the rubber components. Amounts of the oil within the above-described range achieve high balance among an effect of dispersing the reinforcing agent, tensile strength, abrasion resistance and heat resistance.

A composition using, as a rubber component, the polymer or the composition of the polymer according to the present invention may contain, in addition to the above-described components, another additive, for example, filler such as calcium carbonate or talc, amine or phenolic antioxidant, antiozonant, silane coupling agent, activator such as diethylene glycol, processing aid, tackifier, and wax in a necessary amount.

The composition using, as a rubber component, the polymer or the composition of the polymer according to the present invention can be produced by mixing the above-described components in a known rubber kneading machine such as roll or banbury mixer.

The conjugated diene polymer of the present invention is available by the process for production of the above-described conjugated diene polymer. The polymer of the present invention has such a constitution so that it has the above-described advantages.

One preferred embodiment of the polymer composition of the present invention is a conjugated diene polymer composition composed of from 5 to 90 wt. % of a conjugated diene polymer coupled with the polyfunctional modifier other than the low molecular compound represented by the formula (1) or (2), and from 10 to 95 wt. % of the conjugated diene polymer represented by the formula (3) and/or the formula (5) or the conjugated diene polymer represented by the formula (4) and/or the formula (6) and having a Mooney viscosity of from 20 to 200. Such a polymer composition becomes a copolymer composition excellent in cold flow property by containing a conjugated diene polymer coupled with a polyfunctional modifier other than the low molecular compound represented by the formula (1) or (2).

The conjugated diene polymer composition contains preferably from 5 to 60 wt. %, more preferably from 5 to 40 wt. % of the conjugated diene polymer coupled with a polyfunctional agent other than the low molecular compound represented by the formula (1) or (2).

In particular, addition of a glycidyl compound having, in the molecule thereof, an amino group as the polyfunctional modifier is preferred, because the resulting conjugated diene polymer composition has an excellent cold flow property and moreover, when silica, another inorganic filler or carbon black is added to the polymer composition, the resulting composition has good processability, improved dispersion of the silica, another inorganic filler or carbon black and improved various properties.

EXAMPLES

The present invention will hereinafter be described based on Examples. It should however be borne in mind that the present invention is not limited by them. In Examples, samples are analyzed in the following manner.
(1) Bound Styrene Content
A bound styrene content (wt. %) was determined from absorption of styrene at UV 254 nm by a phenyl group while using a chloroform solution as a sample.
(2) Styrene Chain
The content of a styrene single chain having one styrene unit and a styrene long chain having a row of eight styrene units was analyzed in accordance with the method of Tanaka, et al. (*Polymer*, 22, 1721 (1981)) by decompositing a styrene-butadiene copolymer rubber with ozone and then subjecting the decomposed product to gel permeation chromatography (GPC).
(3) Microstructure of a Butadiene Moiety
The microstructure of a butadiene moiety was determined in accordance with a calculation formula of Hampton's method from a predetermined absorbance by using a carbon disulfide solution as a sample and measuring an infrared spectrum within a range of from 600 to 1000 $cm^{-1}$ by using a solution cell ("FT-IR230": JASCO Corporation).
(4) Mooney Viscosity
The viscosity was measured four minutes after 1-minute preheating at 10° C. in accordance with JIS K 6300.
(5) Molecular Weight and Molecular Weight Distribution
The chromatogram was measured by GPC using three connected columns packed with a polystyrene gel as a filler and the molecular weight and molecular weight distribution were calculated based on a calibration curve plotted using standard polystyrene. Tetrahydrofuran was used as a solvent.
(6) Modification Ratio
By utilizing the adsorption property of a modified component to a GPC column using a silica gel as a filler, a chromatogram of GPC ("HLC-8020", product of TOSOH) on the polystyrene gel of (5) ("Shodex", product of Showa Denko) and a chromatogram of GPC ("Column oven CO-8020", product of TOSOH, detector: "RI-8021") on a silica column ("Zorbax", product of Dupont) were obtained for the sample and low-molecular weight internal standard polystyrene and an adsorption amount to the silica column was calculated from their difference, whereby a modification ratio was determined.

Example 1

A temperature-controllable autoclave having an internal volume of 10 liter and equipped with a stirrer and a jacket was used as a reactor and 625 g of butadiene, 225 of styrene, 5500 g of cyclohexane and as a polar substance 0.82 g of 2,2-bis (2-oxolanyl)propane from which impurities had been removed were charged in the reactor. The temperature inside of the reactor was maintained at 30° C. A cyclohexane solution containing 6.75 mmol of n-butyllithium as a polymerization initiator was fed into the reactor. After starting of the reaction, the temperature in the reactor started increasing due to heat induced by polymerization. During from 7 to 12 minutes after the addition of the polymerization initiator, 50 g of butadiene was supplied at a rate of 10 g/min. The final temperature in the reactor reached 77° C. After completion of the reaction, 13.5 mmol of N-[3-(trimethoxysilyl)-propyl]-N, N'-diethyl-N'-trimethylsilyl-ethane-1,2-diamine was added. The mixture was stirred at 75° C. for 5 minutes to cause a modification reaction. After addition of 1.8 g of an antioxidant (BHT) to the resulting polymer solution, the solvent was removed, whereby a styrene-butadiene copolymer (Sample A) having a modified component was obtained.

As a result of analysis of (Sample A), a bound styrene content was 25 wt. %, a bound butadiene content was 75%, and the Mooney viscosity of the polymer was 53. A 1,2-bond content of the microstructure of the butadiene moiety determined by the calculation in accordance with Hampton's method based on the measurement results using an infrared spectrophotometer was 62% and a modification ratio determined by GPC using a silica adsorption column was 83%.

Example 2

In a similar manner to that employed for obtaining Sample A except for the use of 3-(4-trimethylsilyl-1-piperazinyl)propyltriethoxysilane instead of N-[3-(trimethoxysilyl)-propyl]-N,N'-diethyl-N'-trimethylsilyl-ethane-1,2-diamine, a modification reaction was performed, whereby a styrene-butadiene copolymer (Sample B) was obtained. As a result of analysis of (Sample B), a bound styrene content was 25 wt. %, a bound butadiene content was 75%, and the Mooney viscosity of the polymer was 50. A 1,2-bond content of the microstructure of the butadiene moiety determined by the calculation in accordance with Hampton's method based on the measurement results using an infrared spectrophotometer was 63% and a modification ratio determined by GPC using a silica adsorption column was 85%.

Example 3

In a similar manner to that employed for obtaining (Sample A), polymerization reaction was performed. A coupling reaction was then performed by adding 0.25 mmol of tetraglycidyl-1,3-bisaminomethylcyclohexane, a tetrafunctional polyepoxy compound, to the reactor and stirring the mixture at 75° C. for 2 minutes, followed by a modification reaction by adding 11.48 mmol of 3-(4-trimethylsilyl-1-piperazinyl) propyltriethoxysilane, whereby a styrene-butadiene copolymer (Sample C) was obtained. As a result of analysis of (Sample C), a bound styrene content was 25 wt. %, a bound butadiene content was 75%, and the Mooney viscosity of the polymer was 49. A 1,2-bond content of the microstructure of the butadiene moiety determined by the calculation in accordance with Hampton's method based on the measurement results using an infrared spectrophotometer was 62% and a modification ratio determined by GPC using a silica adsorption column was 83%.

Examples 4 and 5

In a similar manner to that employed for obtaining (Sample A), polymerization was performed. Styrene-butadiene copolymers (Samples D and E) were obtained by changing the amounts of butadiene and styrene, amount of n-butyllithium, amount of a polar substance, and amounts of 3-(4-trimethylsilyl-1-piperazinyl)propyltriethoxysilane and tetraglycidyl-1,3-bisaminomethylcyclohexane to be added after completion of the polymerization.

The above-described preparation results are shown in Table 1.

Comparative Example 1

A temperature-controllable autoclave having an internal volume of 10 liter and equipped with a stirrer and a jacket was used as a reactor and 625 g of butadiene, 225 of styrene, 5500 g of cyclohexane and 1.05 g of, as a polar substance, 2,2-bis (2-oxolanyl)propane from which impurities had been removed were charged in the reactor. The temperature inside of the reactor was maintained at 30° C. A cyclohexane solution containing 8.72 mmol of n-butyllithium as a polymerization initiator was fed into the reactor. After starting of the reaction, the temperature in the reactor started increasing due to heat induced by polymerization. During from 7 to 12 minutes after the addition of the polymerization initiator, 50 g of butadiene was supplied at a rate of 10 g/min. The final temperature in the reactor reached 79° C. After completion of the polymerization reaction, 4.36 mmol of tetraglycidyl-1,3-bisaminomethylcyclohexane, a tetrafunctional epoxy compound, was added. The mixture was stirred at 75° C. for 5 minutes to cause a modification reaction. After addition of 1.8 g of an antioxidant (BHT) to the resulting polymer solution, the solvent was removed, whereby a styrene-butadiene copolymer (Sample F) having a modified component was obtained.

As a result of analysis of (Sample F), a bound styrene content was 25 wt. %, a bound butadiene content was 75%, and the Mooney viscosity of the polymer was 76. A 1,2-bond content of the microstructure of the butadiene moiety determined by the calculation in accordance with Hampton's method based on the measurement results using an infrared spectrophotometer was 62%. With respect to polystyrene-equivalent molecular weight as measured by GPC, the weight average molecular weight (Mw) was 600000, the number average molecular weight (Mn) was 440000 and molecular weight distribution (Mw/Mn) was 1.36. A modification ratio determined by GPC using a silica adsorption column was 83%.

Comparative Example 2

In a similar manner to that employed for obtaining (Sample F), polymerization was performed. A styrene-butadiene copolymer (Sample G) was obtained by changing the amounts of butadiene and styrene, amount of n-butyllithium, amount of the polar substance, and amount of tetraglycidyl-1,3-bisaminomethylcyclohexane to be added after completion of the polymerization.

Comparative Example 3

In a similar manner to that employed for obtaining (Sample F), polymerization was performed. Using 0.68 g of 2,2-bis(2-oxolanyl)propane and 5.63 g mmol of n-butyllithium, a polymerization reaction was performed. After completion of the polymerization reaction, 4.79 mmol of dimethylimidazolidinone was added to the reactor, followed by stirring at 75° C. for 5 minutes, whereby a modification reaction was performed. To the polymer solution thus obtained was added 1.8 g of an antioxidant (BHT). The solvent was then removed, whereby a styrene-butadiene copolymer (Sample H) having a modified component was obtained (Sample H). As a result of analysis of (Sample H), a bound styrene content was 25 wt. %, a bound butadiene content was 75%, and the Mooney viscosity of the polymer was 50. A 1,2-bond content of the microstructure of the butadiene moiety determined by the calculation in accordance with Hampton's method based on the measurement results using an infrared spectrophotometer was 62% and a modification ratio determined by GPC using a silica adsorption column was 81%.

Comparative Example 4

A temperature-controllable autoclave having an internal volume of 10 liter and equipped with a stirrer and a jacket was used as a reactor and 625 g of butadiene, 225 g of styrene, 5500 g of cyclohexane and 0.82 g of, as a polar substance, 2,2-bis(2-oxolanyl)propane from which impurities have been removed were charged in the reactor. The temperature inside of the reactor was maintained at 30° C. A cyclohexane solution containing 6.75 mmol of n-butyllithium as a polymerization initiator was fed into the reactor. After starting of the reaction, the temperature in the reactor started increasing due to heat induced by polymerization. During from 7 to 12 minutes after the addition of the polymerization initiator, 50 g of butadiene was supplied at a rate of 10 g/min. The final temperature in the reactor reached 77° C. After completion of the polymerization reaction, 13.5 mmol of N,N-bis(trimethylsilyl)aminopropyltrimethoxysilane was added to the reactor. The mixture was stirred at 75° C. for 5 minutes, whereby a modification reaction was effected. After addition of 1.8 g of an antioxidant (BHT) to the resulting polymer solution, the solvent was removed, whereby a styrene-butadiene copolymer (Sample I) having a modified component was obtained.

As a result of analysis of (Sample I), a bound styrene content was 25 wt. %, a bound butadiene content was 75%, and the Mooney viscosity of the polymer was 50. A 1,2-bond content of the microstructure of the butadiene moiety determined by the calculation in accordance with Hampton's method based on the measurement results using an infrared spectrophotometer was 63. A modification ratio determined by GPC using a silica adsorption column was 84%.

Comparative Example 5

In a similar manner to that employed for obtaining (Sample D), a polymerization reaction was performed. A modification reaction was effected using 3-(N-trimethylsilyl, N-ethylamino)propyltrimethoxysilane instead of 3-(4-trimethylsilyl-1-piperazinyl)propyltriethoxysilane, whereby a styrene-butadiene copolymer (Sample J) was obtained. As a result of analysis of (Sample J), a bound styrene content was 20 wt. %, a bound butadiene content was 80%, and the Mooney viscosity of the polymer was 49. A 1,2-bond content of the microstructure of the butadiene moiety determined by the calculation in accordance with Hampton's method based on the measurement results using an infrared spectrophotometer was 56% and a modification ratio determined by GPC using a silica adsorption column was 81%.

The above-described preparation results are shown in Table 1.

TABLE 1

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|
| Sample | A | B | C | D | E | F | G | H | I | J |
| Butadiene (g) | 625 | 625 | 625 | 670 | 670 | 625 | 670 | 625 | 625 | 670 |
| Amount of butadiene added further (g) | 50 | 50 | 50 | 50 | 50 | 50 | 50 | 50 | 50 | 50 |
| Styrene (g) | 225 | 225 | 225 | 180 | 180 | 225 | 180 | 225 | 225 | 180 |
| n-Butyllithium (mmol) | 6.75 | 6.75 | 6.75 | 6.47 | 6.47 | 8.72 | 8.44 | 5.63 | 6.75 | 6.47 |
| Amount of polar substance (g) *1 | 0.82 | 0.82 | 0.82 | 0.52 | 0.52 | 1.05 | 0.68 | 0.68 | 0.82 | 0.52 |
| Modifier-1 (mmol) *2 | — | — | 0.25 | — | 0.24 | 4.36 | 4.22 | — | — | — |
| Modifier-2 (mmol) *3 | 13.5 | — | — | — | — | — | — | — | — | — |
| Modifier-3 (mmol) *4 | — | 13.5 | 11.48 | 12.9 | 11.0 | — | — | — | — | — |
| Modifier-4 (mmol) *5 | — | — | — | — | — | — | — | 4.79 | — | — |
| Modifier-3 (mmol) *6 | — | — | — | — | — | — | — | — | 13.5 | — |
| Modifier-4 (mmol) *7 | — | — | — | — | — | — | — | — | — | 12.9 |
| Modification ratio (%) | 83 | 85 | 83 | 84 | 82 | 83 | 84 | 81 | 84 | 81 |
| Mooney viscosity | 53 | 50 | 65 | 52 | 63 | 76 | 73 | 50 | 50 | 49 |
| Bound styrene content (%) | 25 | 25 | 25 | 20 | 20 | 25 | 20 | 25 | 25 | 20 |
| 1,2-Vinyl bond content (%) | 62 | 63 | 62 | 55 | 56 | 62 | 55 | 62 | 63 | 56 |
| Weight average molecular weight (Mw) unit: 10000 | — | — | — | — | — | 60 | 55 | — | — | — |
| Number average molecular weight (Mn) unit: 10000 | — | — | — | — | — | 44 | 41 | — | — | — |
| Mw/Mn | — | — | — | — | — | 1.36 | 1.34 | — | — | — |

*1: 2,2-Bis(2-oxolanyl)propane
*2: Tetraglycidyl-1,3-bisaminomethylcyclohexane
*3: N-[3-(Trimethoxysilyl)-propyl]-N,N'-diethyl-N'-trimethylsilyl-ethane-1,2-diamine
*4: 3-(4-Trimethylsilyl-1-piperazinyl)propyltriethoxysilane
*5: Dimethylimidazolidinone
*6: N,N-Bis(trimethylsilyl)aminopropyltrimethoxysilane
*7: 3-(N-Trimethylsilyl, N-ethyl-amino)propyltrimethoxysilane Example 6

Two autoclaves each having an internal volume of 10 liter, having an inlet at the bottom and outlet at the top, and equipped with a stirrer and a temperature controlling jacket were connected in series as reactors and a static mixer was disposed between these two reactors. Butadiene, styrene and n-hexane whose impurities have been removed in advance were mixed at rates of 13.0 g/min, 7 g/min, and 97.6 g/min, respectively. The resulting mixed solution was passed through a dehydration column filled with active alumina. In order to remove impurities further, the solution was mixed at a rate of 0.003 g/min (0.0469 mmol) with n-butyllithium in a static mixer immediately upstream of the first reactor and then, the mixture was continuously fed to the bottom of the first reactor. 2,2-Bis(2-oxolanyl)propane as a polar substance and n-butyllithium as a polymerization initiator were fed to the bottom of the first reactor at rates of 0.013 g/min and 0.0074 g/min (0.116 mol), respectively. The temperature inside the reactor was maintained at 85° C. The polymer solution was taken out continuously from the top portion of the first reactor and then fed to the second reactor. The rate of polymerization at the outlet of the first reactor reached about 10%.

While maintaining the temperature of the second reactor at 80° C., 3-(4-trimethylsilyl-1-piperazinyl)propyltriethoxysilane was added at a rate of 0.232 mmol/min from the bottom of the second reactor, whereby a modification reaction was performed. To the resulting modified polymer solution was added 0.05 g/min (n-hexane solution) continuously to complete the modification reaction. The solvent was then removed, whereby a modified copolymer was obtained. The modified copolymer had a Mooney viscosity of 125. To the resulting copolymer solution was added 37.5 parts by weight of an aromatic oil ("X-140", product of Japan Energy) based on 100 parts by weight of the polymer to yield an oil extended polymer (Sample K).

The oil-extended polymer thus obtained had a Mooney viscosity of 55. Analysis of (Sample K) has revealed that a bound styrene content of the copolymer was 35% and a bound butadiene content was 65%. A 1,2-bond content of a butadiene moiety as determined by calculation based on the measurement results using an infrared spectrophotometer in accordance with the Hampton's method was 38%. The modification ratio of the modified copolymer was 82%.

It is widely and conventionally used in the rubber industry to oil-extend a copolymer having a high molecular weight, that is, a high Mooney viscosity in advance, because it facilitates production of the copolymer and, in subsequent processing, it is effective for improving processability such as mixing with a filler or improving performance due to improvement of dispersion of a filler.

Example 7

After (Sample K) was obtained, tetraglycidyl-1,3-bisaminomethylcyclohexane was added at a rate of 0.0061 mmol/min to the copolymer solution flowing continuously in the static mixer disposed between the first and second reactors and they were mixed in the static mixer. The modification reaction with 3-(4-trimethylsilyl-1-piperazinyl)propyltriethoxysilane in the second reactor was continued. After the reaction became stable, an antioxidant (BHT) was added continuously to the modified polymer solution to complete the modification reaction. The solvent was then removed to yield a modified copolymer. The modified copolymer thus obtained had a Mooney viscosity of 158. To the resulting copolymer solution was added 37.5 parts by weight of an aromatic oil ("X-140", product of Japan Energy) based on 100 parts by weight of the polymer to yield an oil extended copolymer (Sample L). The oil-extended copolymer thus obtained had a Mooney viscosity of 70. A bound styrene content and a 1,2-bond content of the butadiene moiety were equal to those of (Sample K). The modification ratio of the modified copolymer was 81%.

Examples 8 and 9

In a similar manner to that employed for the preparation of (Sample K) or (Sample L), polymerization and modification reaction were performed, whereby oil-extended styrene-butadiene copolymers (Sample M and Sample N) different in amounts of styrene, butadiene, n-butyllithium, polar substance, and tetraglycidyl-1,3-bisaminomethylcyclohexane and 3-(4-trimethylsilyl-1-piperazinyl)propyltriethoxysilane to be added upon completion of the polymerization were obtained (Samples M and N).

The above-described preparation results are shown in Table 2.

According to the analysis results of styrene chains by decomposition of (Sample K) and (Sample L) with ozone, their contents of styrene single chain having one styrene unit were 54% and 44%, respectively, in the whole styrene, while contents of styrene long chain having at least 8 styrene units connected to each other were 2.3% and 2.4%, respectively.

Comparative Example 6

Two autoclaves each having an internal volume of 10 liter, having an inlet at the bottom and an outlet at the top and equipped with a stirrer and a temperature controlling jacket were connected in series as reactors and a static mixer was disposed between these two reactors. Butadiene, styrene and n-hexane whose impurities had been removed in advance were mixed at rates of 13.0 g/min, 7 g/min, and 97.6 g/min, respectively. The resulting mixture was passed through a dehydration column filled with active alumina. In order to remove impurities further, the solution was mixed at a rate of 0.003 g/min (0.0469 mmol) with n-butyllithium in a static mixer immediately upstream of the first reactor and then, the mixture was continuously fed to the bottom of the first reactor. 2,2-Bis(2-oxolanyl)propane as a polar substance and n-butyllithium as a polymerization initiator were fed to the bottom of the first reactor at rates of 0.015 g/min and 0.0090 g/min (0.141 mmol), respectively. The temperature inside of the reactor was maintained at 85° C. The polymer solution was taken out continuously from the top portion of the first reactor and then fed to the second reactor. When the reaction in the first reactor was stable, it was sampled from the outlet of the first reactor and ethanol was added in an amount enough for deactivating the active point. After addition of a stabilizer, the solvent was removed and Mooney viscosity was measured. The copolymer before modification thus obtained had a Mooney viscosity of 83. The rate of polymerization at the outlet of the first reactor reached approximately 100%.

While maintaining the temperature of the second reactor at 80° C., tetraglycidyl-1,3-bisaminomethylcyclohexane, a tetrafunctional polyepoxy compound, was added at a rate of 0.071 mmol/min from the bottom of the second reactor, whereby a modification reaction was performed. To the resulting modified polymer solution was added 0.05 g/min (n-hexane solution) of antioxidant (BHT) continuously to complete the modification reaction. The solvent was then removed, whereby a modified copolymer was obtained. The modified copolymer had a Mooney viscosity of 163. To the resulting copolymer solution was added 37.5 parts by weight of an aromatic oil ("X-140", product of Japan Energy) based on 100 parts by weight of the polymer to yield an oil extended polymer (Sample O). The oil-extended polymer thus obtained had a Mooney viscosity of 72. Analysis of (Sample O) has revealed that a bound styrene content of the copolymer was 35% and a bound butadiene content was 65%. A 1,2-bond content of a butadiene moiety as determined by calculation in accordance with the Hampton's method based on the measurement results by using an infrared spectrophotometer was 38%. A weight average molecular weight (Mw) and molecular distribution (Mw/Mn) as measured by GPC using THF as a solvent were 920000 and 2.1, respectively. The modification ratio of the modified copolymer was 82%.

Comparative Example 7

In a similar manner to that employed for the preparation of (Sample O), polymerization and modification reactions were performed, whereby an oil-extended styrene-butadiene copolymer (Sample P) different in amounts of styrene, butadiene, n-butyllithium, and polar substance and an amount of tetraglycidyl-1,3-bisaminomethylcyclohexane to be added upon completion of the polymerization was obtained.

The above-described preparation results are shown in Table 2.

TABLE 2

|  | Ex. 6 | Ex. 7 | Ex. 8 | Ex. 9 | Comp. Ex. 6 | Comp. Ex. 7 |
|---|---|---|---|---|---|---|
| Sample | K | L | M | M | O | P |
| Butadiene (g/min) | 13 | 13 | 15 | 15 | 13 | 15 |
| Styrene (g/m) | 7.0 | 7.0 | 5.0 | 5.0 | 7.0 | 5.0 |
| n-Butyllithium (mmol/min) | 0.116 | 0.116 | 0.100 | 0.100 | 0.141 | 0.134 |
| Amount of polar substance (g/min) *1 | 0.013 | 0.013 | 0.025 | 0.025 | 0.015 | 0.029 |
| Modifier-1 mmol/min *2 | — | 0.0061 | — | 0.0053 | 0.071 | 0.067 |
| Modifier-3 mmol/min *3 | 0.232 | 0.232 | 0.200 | 0.200 | — | — |
| Modification ratio | 82 | 81 | 81 | 81 | 82 | 78 |
| Mooney viscosity before oil extention | 125 | 158 | 120 | 153 | 163 | 160 |
| 37.5 parts by weight oil extension Mooney viscosity | 55.0 | 70 | 53 | 67 | 72 | 70 |
| Bound styrene content (%) | 35 | 35 | 25 | 25 | 35 | 25 |
| 1,2-vinyl bond content (%) | 38 | 38 | 63 | 64 | 38 | 64 |
| Weight average molecular weight (Mw) unit: 10000 | — | — | — | — | 92 | 95 |
| Number average molecular weight (Mn) Unit: 10000 | — | — | — | — | 44 | 45 |
| Mw/Mn | — | — | — | — | 2.1 | 2.1 |
| Styrene single chain (%) | 54 | — | 44 | — | — | — |
| Styrene long chain (%) | 2.3 | — | 2.4 | — | — | — |

*1: 2,2-Bis(2-oxolanyl)propane
*2: Tetraglycidyl-1,3-bisaminomethylcyclohexane
*3: 3-(4-Timethylsilyl-1-piperazinyl)propyltriethoxysilane Examples 10 to 14, and Comparative Examples 8 to 12

Rubber compositions having the composition shown in Table 3 were obtained using samples (Sample A to Sample J) shown in Table 1 as raw material rubber.

TABLE 3

| Copolymer | 70.0 parts by weight |
|---|---|
| Natural rubber | 30.0 parts by weight |
| Silia ("Ultrasil VN3", product of Degussa) | 45.0 parts by weight |
| Carbon ("Seast KH", product of Tokai Carbon) | 5.0 parts by weight |
| Silane coupling agent ("Si69", product of Degussa) | 4.5 parts by weight |
| Aromatic oil ("X140", product of Japan Energy) | 5.0 parts by weight |
| Zinc white | 3.0 parts by weight |
| Stearic acid | 2.0 parts by weight |
| Antioxidant (N-isopropyl-N'-phenyl-p-phenylenediamine) | 1.0 parts by weight |
| Sulfur | 1.4 parts by weight |
| Vulcanizing accelerator (N-cyclohexyl-2-benzothiazylsulfenamide) | 1.0 parts by weight |
| Vulcanizing accelerator (diphenylguanidine) | 1.5 parts by weight |
| Total | 169.4 parts by weight |

Keading was performed in the following manner.

In an enclosed kneader (internal volume: 0.3 liter) equipped with a thermostat, a raw material rubber, filler (silica and carbon black), organosilane coupling agent, aromatic oil, zinc white and stearic acid were kneaded as the first-stage kneading under the conditions of a filling ratio of 65% and rotation number of the rotor of 50/57 rpm. Upon kneading, the temperature of the enclosed mixer was controlled and rubber compositions were obtained at a discharge temperature (mixture) of from 155 to 160° C.

After cooling of the mixture thus obtained to room temperature, an antioxidant was added thereto and then, kneading was conducted again as the second-stage kneading to improve dispersion of silica. Also in this case, the discharge temperature (mixture) was adjusted to from 155 to 160° C. by the temperature control of the mixer.

After cooling, sulfur and a vulcanizing accelerator were kneaded as the third-stage kneading in an open roll set at 70° C.

The resulting kneaded mass was molded and vulcanized using a vulcanizing press at 160° C. for a predetermined time. Physical properties were measured and measurement results of the physical properties are shown in Table 4.

Physical properties were measured in the following manner.

(1) Bound Rubber Content:

The blend (about 0.2 g) after completion of the second-stage kneading was cut into square pieces of about 1 mm and placed in a Harris's basket (made of a 100-mesh metal mesh). These pieces were weighed. After immersion in toluene for 24 hours, they were dried and weighed again. A ratio of the rubber bound to the filler to the rubber amount in the first blend was determined from the amount of the rubber bound to the filler calculated in consideration of the amount of the component not dissolved in toluene.

(2) Tensile Test

Tensile test was performed in accordance with the tensile test method of JIS-K6251.

(3) Measurement of Viscoelasticity

Using an ARES viscoelasticity tester manufactured by Rheometric, viscoelasticity was measured using a torsion system at a frequency of 10 Hz.

The Payne effect (ΔG) is indicated as a difference between the minimum and maximum values at a strain of from 0.1 to 10%.

When the Payne effect is smaller, the dispersion of the filler such as silica is better.

When the low-temperature Tan δ is higher, the rubber composition has better wet skid resistance (grip performance). When the high-temperature Tan δ is lower, the composition has less hysteresis loss and lower rolling resistance of tires, that is, lower fuel cost.

(4) Measurement of Rebound Resilience

Rebound resilience at 50° C. was measured by the Lupke type rebound resilience testing method in accordance with JIS K6255.

(5) Heat Build-Up

Measurement was made using a Goodrich flexometer at a rotation number of 1800 rpm, stroke of 0.225 inch, load of 55 pound and measurement starting temperature of 50° C. The heat build-up was indicated by a difference in temperature at which the measurement was started and temperature after 20 minutes.

(6) Akron Abrasion Loss

Abrasion resistance was studied by measuring an abrasion loss at 3000 rotations under a load of 6 pounds by using an Akron abrasion tester. As the index is higher, the abrasion loss is smaller and more preferable.

TABLE 4

|  | Ex. 10 | Ex. 11 | EX. 12 | Ex. 13 | Ex. 14 | Comp. Ex. 8 | Comp. Ex. 9 | Comp. Ex. 10 | Comp. Ex. 11 | Comp. Ex. 12 |
|---|---|---|---|---|---|---|---|---|---|---|
| Copolymer | A | B | C | D | E | F | G | H | I | J |
| Mooney viscosity of blend | 64 | 62 | 66 | 64 | 67 | 62 | 67 | 76 | 64 | 63 |
| Bound rubber content (%) | 62 | 65 | 64 | 65 | 64 | 43 | 41 | 52 | 54 | 52 |
| 300% Modulus Mp | 12.4 | 12.8 | 13.0 | 11.6 | 11.6 | 12.6 | 11.0 | 13.2 | 12.5 | 11.2 |
| Tensile strength Mp | 21.8 | 22.0 | 22.2 | 20.3 | 20.4 | 20.5 | 19.6 | 21.2 | 21.0 | 19.7 |
| 50° C. Rebound resilience (%) | 68.5 | 69.5 | 69.0 | 72.0 | 71.5 | 62.0 | 65.0 | 65.0 | 65.0 | 67.5 |
| Heat build-up ° C. | 20.0 | 19.0 | 19.0 | 17.0 | 17.5 | 23.0 | 21.5 | 21.5 | 21.0 | 20.0 |
| Abrasion resistance (index) | 127 | 134 | 129 | 150 | 147 | 100 | 113 | 112 | 114 | 122 |
| 0° C. Tanδ (strain 1%) | 0.648 | 0.690 | 0.68 | 0.367 | 0.37 | 0.552 | 0.347 | 0.565 | 0.616 | 0.350 |
| 50° C. Tanδ (strain 3%) | 0.073 | 0.066 | 0.068 | 0.048 | 0.053 | 0.110 | 0.098 | 0.096 | 0.093 | 0.076 |
| 50° C. G'Mp (strain 3%) | 2.57 | 2.30 | 2.40 | 2.02 | 2.21 | 3.82 | 3.18 | 3.10 | 2.80 | 2.66 |
| 50° C. ΔG'Mp | 0.58 | 0.33 | 0.45 | 0.30 | 0.42 | 1.40 | 1.30 | 1.21 | 0.85 | 0.70 |

As shown in Examples 10 to 14 in Table 4, it is apparent that in silica-containing compositions, the conjugated diene polymers prepared according to the present invention feature an increased bound rubber content, improved silica dispersion with small Payne effect, small hysteresis loss with low Tan δ at high-temperature, and low rolling resistance of tires, that is, high fuel efficiency. In addition, they have excellent balance between high fuel efficiency and wet skid resistance (grip performance) and also have good abrasion resistance.

Examples 15 to 18 and Comparative Examples 13 and 14

Rubber compositions were prepared in accordance with the formulation shown in Table 5 by using samples (Samples K to P) shown in Table 2 as raw material rubbers.

TABLE 5

| Rubber: Copolymer | 70.0 parts by weight |
|---|---|
| Rubber: Polybutadiene rubber ("UBEPOL-150") | 30.0 parts by weight |
| Silica ("ULTRASIL VN3", product of Degussa) | 63.0 parts by weight |
| Carbon ("Seast KH", product of Tokai Carbon) | 7.0 parts by weight |
| Silane coupling agent ("Si69", product of Degussa) | 6.3 parts by weight |
| Oil ("X140", product of Japan Energy) | 37.5 parts by weight |
| Zinc white | 2.5 parts by weight |
| Stearic acid | 1.0 part by weight |
| Antioxidant (N-isopropyl-N'-phenyl-p-phenylenediamine) | 2.0 part by weight |
| Sulfur | 1.1 part by weight |
| Vulcanizing accelerator (N-cyclohexyl-2-benzothiazylsulfenamide) | 1.7 part by weight |
| Vulcanizing accelerator (Diphenylguanidine) | 2.0 part by weight |
| Total | 224.1 parts by weight |

Kneading was performed in the following manner.

In an enclosed kneader (internal volume: 1.7 liter) equipped with a thermostat using water circulated from the outside, a raw material rubber, filler (silica and carbon black), organosilane coupling agent, aromatic oil, zinc white and stearic acid were kneaded as the first-stage kneading under the conditions of a filling rate of 65% and rotation number of the rotor of 66/77 rpm. Upon kneading, the temperature of the enclosed mixer was controlled and rubber compositions were obtained at a discharge temperature (blend) of from 155 to 160° C.

After cooling of the blend thus obtained to room temperature, an antioxidant was added thereto and then, kneading was conducted again as the second-stage kneading to improve dispersion of silica. In this case, the discharge temperature (blend) was adjusted to 155 to 160° C. by controlling the temperature of the mixer.

After cooling, sulfur and a vulcanizing accelerator were kneaded as the third-stage kneading in an open roll set at 70° C.

The resulting kneaded mass was molded and vulcanized using a vulcanizing press at 160° C. for a predetermined time. The below-described physical properties were measured and results are shown in Table 6.

The physical properties were measured in a similar manner to those employed in Examples 10 to 14.

TABLE 6

|  | Ex. 15 | Ex. 16 | Ex. 17 | Ex. 18 | Comp. Ex. 13 | Comp. Ex. 14 |
| --- | --- | --- | --- | --- | --- | --- |
| Copolymer | K | L | M | N | O | P |
| Mooney viscosity of blend | 60 | 66 | 65 | 70 | 59 | 53 |
| Bound rubber content (%) | 60 | 58 | 62 | 60 | 42 | 43 |
| 300% Modulus Mp | 7.7 | 7.9 | 8.0 | 8.3 | 8.3 | 8.3 |
| Tensile strength Mp | 23.2 | 23.5 | 22.0 | 22.3 | 23.8 | 22.1 |
| 50° C. Rebound resilience (%) | 60.0 | 59.5 | 57.5 | 57.5 | 55.0 | 53.0 |
| Abrasion resistance (index) | 139 | 140 | 119 | 121 | 100 | 92 |
| Heat build-up ° C. | 26.5 | 27.0 | 26.0 | 26.0 | 29.0 | 29.0 |
| 0° C. Tanδ (strain 1%) | 0.337 | 0.331 | 0.435 | 0.441 | 0.321 | 0.409 |
| 50° C. Tanδ (strain 3%) | 0.117 | 0.122 | 0.138 | 0.141 | 0.165 | 0.174 |
| 50° C. G'Mp (strain 3%) | 2.75 | 2.89 | 2.70 | 2.77 | 3.89 | 3.79 |
| 50° C. ΔG'Mp | 1.02 | 1.24 | 1.12 | 1.30 | 2.98 | 2.89 |

Mooney viscosity of the blend: measured at 130° C.

As shown in Examples 15 to 18 in Table 6, it is apparent that in silica-containing compositions, the conjugated diene polymers prepared according to the present invention feature an increased bound rubber content, improved silica dispersion with a small Payne effect, small hysteresis loss with low Tan δ at high-temperature, and low rolling resistance of tires, that is, high fuel efficiency. In addition, they have excellent balance between high fuel efficiency and wet skid resistance (grip performance) and also have good abrasion resistance.

Examples 19 to 21 and Comparative Examples 15 and 16

Rubber compositions were prepared in accordance with the formulation shown in Table 7 by using the samples (Samples B to G) shown in Table 1 as a raw material rubber.

TABLE 7

| Rubber: Copolymer | 100.0 parts by weight |
| --- | --- |
| Carbon ("Seast KH", product of Tokai Carbon) | 45.0 parts by weight |
| Oil ("X140", product of Japan Energy) | 5.0 parts by weight |
| Zinc white | 5.0 parts by weight |
| Stearic acid | 2.0 parts by weight |
| Antioxidant (N-isopropyl-N'-phenyl-p-phenylenediamine) | 1.0 part by weight |
| Sulfur | 1.7 part by weight |
| Vulcanizing accelerator (N-cyclohexyl-2-benzothiazylsulfeneamide) | 1.0 part by weight |
| Total | 160.7 parts by weight |

Kneading and measurement of physical properties were performed in a similar manner to those employed in Examples 10 to 14. The measurement results of physical properties are shown in Table 8.

TABLE 8

|  | Ex. 19 | Ex. 20 | Ex. 21 | Comp. Ex. 15 | Comp. Ex. 16 |
| --- | --- | --- | --- | --- | --- |
| Copolymer | B | C | D | F | G |
| Mooney viscosity of blend | 79 | 82 | 84 | 75 | 78 |
| Bound rubber content (%) | 38 | 38 | 36 | 23 | 22 |
| 300% Modulus Mp | 12.8 | 12.5 | 11.9 | 12.2 | 11.3 |
| Tensile strength Mp | 20.5 | 20.7 | 19.3 | 19.0 | 17.8 |
| 50° C. Rebound resilience (%) | 58.5 | 57.5 | 62.0 | 50.0 | 53.5 |
| Heat build-up ° C. | 28.0 | 29.0 | 26.5 | 35.0 | 32.0 |
| Abrasion resistance (index) | 137 | 134 | 159 | 100 | 115 |
| 0° C. Tanδ (strain 1%) | 0.770 | 0.754 | 0.491 | 0.740 | 0.474 |
| 50° C. Tanδ (strain 3%) | 0.158 | 0.163 | 0.130 | 0.219 | 0.186 |
| 50° C. G'Mp (strain 3%) | 3.20 | 3.30 | 2.98 | 4.15 | 3.89 |
| 50° C. ΔG'Mp | 1.95 | 1.99 | 1.61 | 3.32 | 2.89 |

Mooney viscosity of the blend: measured at 130° C.

As shown in Examples 19 to 21 in Table 8, it is apparent that in the carbon-containing compositions, the conjugated diene polymer prepared according to the present invention feature an increased bound rubber content, improved silica dispersion with small Payne effect, small hysteresis loss with low Tan δ at high-temperature, and low rolling resistance of tires, that is, high fuel efficiency. In addition, they have excellent balance between high fuel efficiency and wet skid resistance (grip performance) and also have good abrasion resistance.

INDUSTRIAL APPLICABILITY

A conjugated diene polymer produced according to the process of the present invention can provide, by using for a blend containing a filler such as reinforcing silica or carbon, a vulcanized rubber composition for tire tread excellent in strength properties, fuel-cost-saving performance, grip performance and abrasion resistance.

The conjugated diene polymer can also be used for footwear, automotive parts and industrial goods by utilizing such properties. When the conjugated diene polymer is a thermoplastic elastomer, it enables uniform dispersion of an inorganic filler such as silica, metal oxide or metal hydroxide, or carbon so that the resulting composition has improved strength, flame retardancy, elongation and transparency compared with those of the conventional ones. When the conjugated diene polymer is used for an asphalt composition, the resulting composition has improved aggregate holding property. Moreover, when the conjugated diene polymer is a thermoplastic elastomer or thermoplastic resin, compatibility with another polar resin is improved in a blend composition and fine and uniform dispersion can be obtained.

The invention claimed is:

1. A process for producing a conjugated diene polymer composition, which comprises of polymerizing a conjugated diene compound or a conjugated diene compound and an aromatic vinyl compound in a hydrocarbon solvent in the presence of at least one compound selected from the group consisting of organoalkali metals and organoalkaline earth metals as an initiator and then reacting the active end of the resulting polymer with a low molecular compound represented by the following formula (1) or the following formula (2):

[Chemical formula 1]

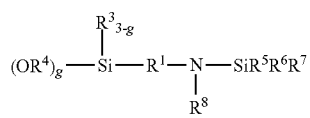

(1)

[Chemical formula 2]

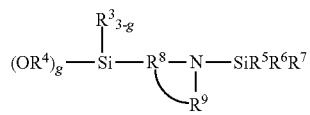

(2)

(wherein in the formula (1), $R^1$ represents an organic group containing an N atom not adjacent to the N atom of the aminosilyl group and having a molecular weight not greater than 1000, $R^2$ represents a $C_{1-10}$ hydrocarbon group or a $C_{1-10}$ hydrocarbon group having no active hydrogen and substituted with an Si, O, N or S atom, $R^3$ and $R^4$ each independently represents a $C_{1-20}$ alkyl group or aryl group, $R^5$, $R^6$, and $R^7$ each represents a $C_{1-20}$ alkyl group or aryl group or a $C_{1-12}$ alkoxy group and g stands for an integer from 1 to 3, and
in the formula (2), $R^8$ and $R^9$ each represents a $C_{1-10}$ hydrocarbon group, a $C_{1-10}$ hydrocarbon group having no active hydrogen and substituted with an Si, O, N or S atom, or an organic group containing an N atom not adjacent to the N atom of an aminosilyl group and having a molecular weight not greater than 1000, and $R^3$, $R^4$, $R^5$, $R^6$, $R^7$ and g have the same meanings as defined in the formula (1)).

2. A process for producing a conjugated diene polymer composition according to claim 1, wherein a conjugated diene compound or a conjugated diene compound and an aromatic vinyl compound are polymerized in a hydrocarbon solvent in the presence of at least one compound selected from the group consisting of organoalkali metals and organoalkaline earth metals and then the active ends of the conjugated diene polymer is coupled by a polyfunctional modifier before or after reacting the active end of the resulting polymer with a low molecular compound represented by the formula (1) or formula (2).

3. A process for producing a conjugated diene polymer according to claim 1, wherein the low molecular compound represented by the formula (2) is 3-(4-trialkylsilyl-1-piperazinyl)propylalkyldialkoxysilane, 3-(4-trialkylsilyl-1-piperazinyl)propyltrialkoxysilane, 3-(3-trialkylsilyl-1-imidazolidinyl)propylalkyldialkoxysilane, 3-(3-trialkylsilyl-1-imidazolidinyl)propyltrialkoxysilane, 3-(3-trialkylsilyl-1-hexahydropyrimidinyl)propylalkyldialkoxysilane or 3-(3-trialkylsilyl-1-hexahydropyrimidinyl)propyltrialkoxysilane.

4. A process for producing a conjugated diene polymer according to claim 2, wherein the polyfunctional modifier is a glycidyl compound having, in the molecule thereof, an amino group.

5. A conjugated diene polymer represented by the following formula (3) or the following formula (4):

[Chemical formula 3]

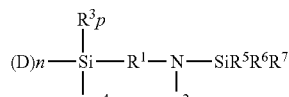

(3)

[Chemical formula 4]

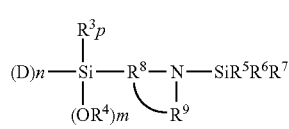

(4)

(wherein, D represents a conjugated diene polymer,
in the formula (3), $R^1$ represents an organic group containing an N atom not adjacent to the N atom of the aminosilyl group and having a molecular weight not greater than 1000, $R^2$ represents a $C_{1-10}$ hydrocarbon group or a $C_{1-10}$ hydrocarbon group having no active hydrogen and substituted with an Si, O, N or S atom, $R^3$ and $R^4$ each independently represents a $C_{1-20}$ alkyl group or aryl group, $R^5$, $R^6$, and $R^7$ each represents a $C_{1-20}$ alkyl group or aryl group or a $C_{1-12}$ alkoxy group and n stands for an integer from 1 to 3, m and p each stands for an integer from 0 to 2, and n+m+p=3, and
in the formula (4), $R^8$ and $R^9$ each represents a $C_{1-10}$ hydrocarbon group, a $C_{1-10}$ hydrocarbon group having no active hydrogen and substituted with an Si, O, N or S atom or an organic group having an N atom not adjacent to the N atom of the aminosilyl group and having a molecular weight not greater than 1000, and $R^3$, $R^4$, $R^5$, $R^6$, $R^7$, n, m, p, and n+m+p have the same meanings as defined in the formula (3)).

6. A conjugated diene polymer represented by the following formula (5) or the following formula (6):

[Chemical formula 5]

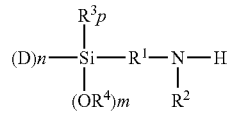

(5)

[Chemical formula 6]

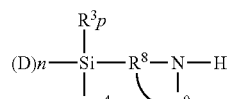

(6)

(wherein, D represents a conjugated diene polymer,
in the formula (5), $R^1$ represents an organic group having an N atom not adjacent to the N atom of the secondary amino group and having a molecular weight not greater than 1000, $R^2$ represents a $C_{1-10}$ hydrocarbon group or a $C_{1-10}$ hydrocarbon group having no active hydrogen and substituted with an Si, O, N or S atom, $R^3$ and $R^4$ each independently represents a $C_{1-20}$ alkyl group or aryl group, and n stands for an integer from 1 to 3, and m and p each stands for an integer from 0 to 2, and n+m+p=3, and in the formula (6), $R^8$ and $R^9$ each represents a $C_{1-10}$ hydrocarbon group, a $C_{1-10}$ hydrocarbon group having no active hydrogen and substituted with an Si, O, N or S atom or an organic group having an N atom not adjacent to the N atom of the secondary amino group and having a molecular weight not greater than 1000, and $R^3$, $R^4$, n, m, p and n+m+p have the same meanings as defined in the formula (5)).

7. A conjugated diene polymer composition comprising from 1 to 99 wt. % of the conjugated diene polymer represented by the formula (3) and from 1 to 99 wt. % of the conjugated diene polymer represented by the formula (5), or from 1 to 99 wt. % of the conjugated diene polymer represented by the formula (4) and from 1 to 99 wt. % of the conjugated diene polymer represented by the formula (6):

[Chemical formula 7]

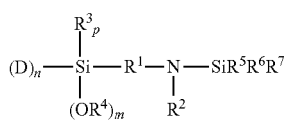
(3)

[Chemical formula 8]

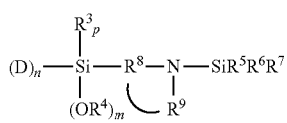
(4)

[Chemical formula 9]

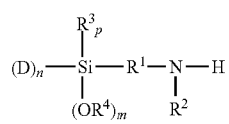
(5)

[Chemical formula 10]

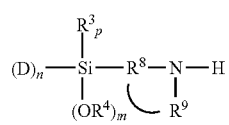
(6)

(wherein, D represents a conjugated diene polymer, in the formula (3), $R^1$ represents an organic group containing an N atom not adjacent to the N atom of the aminosilyl group and having a molecular weight not greater than 1000, $R^2$ represents a $C_{1-10}$ hydrocarbon group or a $C_{1-10}$ hydrocarbon group having no active hydrogen and substituted with an Si, O, N or S atom, $R^3$ and $R^4$ each independently represents a $C_{1-20}$ alkyl group or aryl group, $R^5$, $R^6$, and $R^7$ each represents a $C_{1-20}$ alkyl group or aryl group or a $C_{1-12}$ alkoxy group and n stands for an integer from 1 to 3, m and p each stands for an integer from 0 to 2, and n+m+p=3, in the formula (4), $R^8$ and $R^9$ each represents a $C_{1-10}$ hydrocarbon group, a $C_{1-10}$ hydrocarbon group having no active hydrogen and substituted with an Si, O, N or S atom or an organic group having an N atom not adjacent to the N atom of the aminosilyl group and having a molecular weight not greater than 1000, and $R^3$, $R^4$, $R^5$, $R^6$, $R^7$, n, m, p, and n+m+p have the same meanings as defined in the formula (3), in the formula (5), $R^1$ represents an organic group having an N atom not adjacent to the N atom of the secondary amino group and having a molecular weight not greater than 1000, $R^2$ represents a $C_{1-10}$ hydrocarbon group or a $C_{1-10}$ hydrocarbon group having no active hydrogen and substituted with an Si, O, N or S atom, $R^3$ and $R^4$ each independently represents a $C_{1-20}$ alkyl group or aryl group, and n stands for an integer from 1 to 3, and m and p each stands for an integer from 0 to 2, and n+m+p=3, and in the formula (6), $R^8$ and $R^9$ each represents a $C_{1-10}$ hydrocarbon group, a $C_{1-10}$ hydrocarbon group having no active hydrogen and substituted with an Si, O, N or S atom or an organic group having an N atom not adjacent to the N atom of the secondary amino group and having a molecular weight not greater than 1000, and $R^3$, $R^4$, n, m, p and n+m+p have the same meanings as defined in the formula (5)).

8. A conjugated diene polymer composition comprising from 5 to 90 wt. % of a conjugated diene polymer coupled with a polyfunctional modifier other than a low molecular compound represented by the formula (1) or the formula (2) and from 10 to 95 wt. % of a conjugated diene polymer(s) represented by the formula (3) and/or the formula (5) or a conjugated diene polymer(s) represented by the formula (4) and/or the formula (6) and having a Mooney viscosity of from 20 to 200:

[Chemical formula 11]

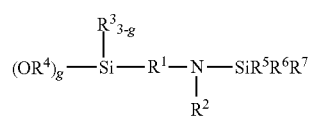
(1)

[Chemical formula 12]

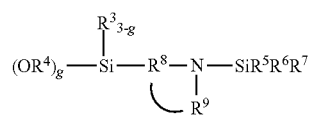
(2)

[Chemical formula 13]

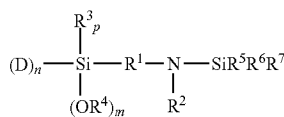
(3)

[Chemical formula 14]

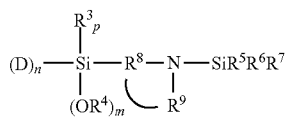
(4)

[Chemical formula 15]

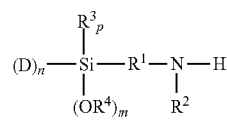
(5)

[Chemical formula 16]

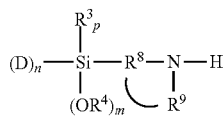

(6)

(wherein in the formula (1), $R^1$ represents an organic group containing an N atom not adjacent to the N atom of the aminosilyl group and having a molecular weight not greater than 1000, $R^2$ represents a $C_{1-10}$ hydrocarbon group or a $C_{1-10}$ hydrocarbon group having no active hydrogen and substituted with an Si, O, N or S atom, $R^3$ and $R^4$ each independently represents a $C_{1-20}$ alkyl group or aryl group, $R^5$, $R^6$, and $R^7$ each represents a $C_{1-20}$ alkyl group or aryl group or a $C_{1-12}$ alkoxy group and g stands for an integer from 1 to 3, in the formula (2), $R^8$ and $R^9$ each represents a $C_{1-10}$ hydrocarbon group, a $C_{1-10}$ hydrocarbon group having no active hydrogen and substituted with an Si, O, N or S atom, or an organic group containing an N atom not adjacent to the N atom of an aminosilyl group and having a molecular weight not greater than 1000, and $R^3$, $R^4$, $R^5$, $R^6$, $R^7$ and g have the same meanings as defined in the formula (1), in the formula (3), D represents a conjugated diene polymer, $R^1$ represents an organic group containing an N atom not adjacent to the N atom of the aminosilyl group and having a molecular weight not greater than 1000, $R^2$ represents a $C_{1-10}$ hydrocarbon group or a $C_{1-10}$ hydrocarbon group having no active hydrogen and substituted with an Si, O, N or S atom, $R^3$ and $R^4$ each independently represents a $C_{1-20}$ alkyl group or aryl group, $R^5$, $R^6$, and $R^7$ each represents a $C_{1-20}$ alkyl group or aryl group or a $C_{1-12}$ alkoxy group and n stands for an integer from 1 to 3, m and p each stands for an integer from 0 to 2, and n+m+p=3, in the formula (4), D represents a conjugated diene polymer, $R^8$ and $R^9$ each represents a $C_{1-10}$ hydrocarbon group, a $C_{1-10}$ hydrocarbon group having no active hydrogen and substituted with an Si, O, N or S atom or an organic group having an N atom not adjacent to the N atom of the aminosilyl group and having a molecular weight not greater than 1000, and $R^3$, $R^4$, $R^5$, $R^6$, $R^7$, n, m, p, and n+m+p have the same meanings as defined in the formula (3), in the formula (5), D represents a conjugated diene polymer, $R^1$ represents an organic group having an N atom not adjacent to the N atom of the secondary amino group and having a molecular weight not greater than 1000, $R^2$ represents a $C_{1-10}$ hydrocarbon group or a $C_{1-10}$ hydrocarbon group having no active hydrogen and substituted with an Si, O, N or S atom, $R^3$ and $R^4$ each independently represents a $C_{1-20}$ alkyl group or aryl group, and n stands for an integer from 1 to 3, and m and p each stands for an integer from 0 to 2, and n+m+p=3, and in the formula (6), D represents a conjugated diene polymer, $R^8$ and $R^9$ each represents a $C_{1-10}$ hydrocarbon group, a $C_{1-10}$ hydrocarbon group having no active hydrogen and substituted with an Si, O, N or S atom or an organic group having an N atom not adjacent to the N atom of the secondary amino group and having a molecular weight not greater than 1000, and $R^3$, $R^4$, n, m, p and n+m+p have the same meanings as defined in the formula (5)).

9. A conjugated diene polymer composition according to claim 8, wherein the polyfunctional modifier is a glycidyl compound having, in the molecule thereof, an amino group.

* * * * *